US012535325B2

(12) United States Patent
Ebrahimi Afrouzi et al.

(10) Patent No.: US 12,535,325 B2
(45) Date of Patent: *Jan. 27, 2026

(54) METHOD FOR CONSTRUCTING A MAP WHILE PERFORMING WORK

(71) Applicants: Ali Ebrahimi Afrouzi, Henderson, NV (US); Lukas Robinson, York (CA); Chen Zhang, Redmond, WA (US); Sebastian Schweigert, Sunnyvale, CA (US)

(72) Inventors: Ali Ebrahimi Afrouzi, Henderson, NV (US); Lukas Robinson, York (CA); Chen Zhang, Redmond, WA (US); Sebastian Schweigert, Sunnyvale, CA (US)

(73) Assignee: AI Incorporated, Toronto (CA)

( * ) Notice: Subject to any disclaimer, the term of this patent is extended or adjusted under 35 U.S.C. 154(b) by 70 days.

This patent is subject to a terminal disclaimer.

(21) Appl. No.: 18/526,723

(22) Filed: Dec. 1, 2023

(65) Prior Publication Data

US 2024/0118091 A1 Apr. 11, 2024

Related U.S. Application Data

(63) Continuation of application No. 17/535,968, filed on Nov. 26, 2021, now Pat. No. 11,835,343, which is a
(Continued)

(51) Int. Cl.
*G01C 21/30* (2006.01)
*G01C 21/16* (2006.01)
(Continued)

(52) U.S. Cl.
CPC ........... *G01C 21/30* (2013.01); *G01C 21/165* (2013.01); *G01C 21/206* (2013.01); *G01S 17/89* (2013.01);
(Continued)

(58) Field of Classification Search
CPC .... G01C 21/30; G01C 21/165; G01C 21/206; G01S 17/89; G06T 7/11; G06T 7/30;
(Continued)

(56) References Cited

U.S. PATENT DOCUMENTS 6,169,552 B1 * 1/2001 Endo ................ G08G 1/0969
345/581
6,535,793 B2 * 3/2003 Allard ................ G05D 1/0246
345/184
(Continued)

FOREIGN PATENT DOCUMENTS

EP     3327669 A1 *  5/2018  ............. G06T 7/20
JP   H07120197 B2 * 12/1995

OTHER PUBLICATIONS

"Exploring information theory for vision-based volumetric mapping;" Rocha et al., 2005 IEEE/RSJ International Conference on Intelligent Robots and Systems (2005, pp. 1023-1028); Jan. 1, 2005. (Year: 2005).*
(Continued)

*Primary Examiner* — Bao Long T Nguyen
*Assistant Examiner* — Jorge O Peche

(57) ABSTRACT

A method executed by a robot, including: starting, from a starting position, a work session in which the robot maps a workspace, wherein a front of the robot faces towards a forward direction in a frame of reference of the robot; the robot traversing, from the starting position, to a first position, a first distance from the starting position in a backward direction in the frame of reference of the robot; after traversing the first distance, the robot rotating; after rotating, the robot traversing a coverage path of at least one area of the workspace, the coverage path including a boustrophedon
(Continued)

movement pattern; and the robot cleaning the at least one area of the workspace with a cleaning tool of the robot while traversing the coverage path.

33 Claims, 14 Drawing Sheets

Related U.S. Application Data continuation of application No. 16/597,945, filed on Oct. 10, 2019, now Pat. No. 11,215,461, which is a continuation of application No. 16/163,562, filed on Oct. 17, 2018, now Pat. No. 10,809,071.

(60) Provisional application No. 62/740,573, filed on Oct. 3, 2018, provisional application No. 62/740,580, filed on Oct. 3, 2018, provisional application No. 62/573,591, filed on Oct. 17, 2017, provisional application No. 62/637,185, filed on Mar. 1, 2018, provisional application No. 62/613,005, filed on Jan. 2, 2018, provisional application No. 62/599,216, filed on Dec. 15, 2017, provisional application No. 62/573,579, filed on Oct. 17, 2017, provisional application No. 62/637,156, filed on Mar. 1, 2018, provisional application No. 62/573,598, filed on Oct. 17, 2017, provisional application No. 62/591,217, filed on Nov. 28, 2017, provisional application No. 62/616,928, filed on Jan. 12, 2018, provisional application No. 62/614,449, filed on Jan. 7, 2018, provisional application No. 62/590,205, filed on Nov. 22, 2017, provisional application No. 62/666,266, filed on May 3, 2018, provisional application No. 62/661,802, filed on Apr. 24, 2018, provisional application No. 62/631,050, filed on Feb. 15, 2018, provisional application No. 62/640,444, filed on Mar. 8, 2018, provisional application No. 62/648,026, filed on Mar. 26, 2018, provisional application No. 62/655,494, filed on Apr. 10, 2018, provisional application No. 62/665,095, filed on May 1, 2018, provisional application No. 62/674,173, filed on May 21, 2018, provisional application No. 62/688,497, filed on Jun. 22, 2018, provisional application No. 62/740,558, filed on Oct. 3, 2018, provisional application No. 62/746,688, filed on Oct. 17, 2018.

(51) Int. Cl.
| | | |
|---|---|---|
| *G01C 21/20* | (2006.01) | |
| *G01S 17/89* | (2020.01) | |
| *G05D 1/00* | (2006.01) | |
| *G06T 7/11* | (2017.01) | |
| *G06T 7/30* | (2017.01) | |
| *G06T 7/55* | (2017.01) | |
| *G06T 3/14* | (2024.01) | |
| *G06T 7/521* | (2017.01) | |

(52) U.S. Cl.
CPC ......... *G05D 1/0088* (2013.01); *G05D 1/0219* (2013.01); *G05D 1/0272* (2013.01); *G05D 1/0274* (2013.01); *G06T 7/11* (2017.01); *G06T 7/30* (2017.01); *G06T 7/55* (2017.01); *A47L 2201/022* (2013.01); *A47L 2201/04* (2013.01); *G05D 1/0242* (2013.01); *G05D 1/0246* (2013.01); *G05D 1/0255* (2013.01); *G05D 1/0257* (2013.01); *G06T 3/14* (2024.01); *G06T 7/521* (2017.01); *G06T 2207/10028* (2013.01)

(58) Field of Classification Search
CPC .. G06T 7/55; G06T 3/14; G06T 7/521; G06T 2207/10028; A47L 2201/022; A47L 2201/04; G05D 1/648; G05D 2105/10; G05D 2107/40; G05D 2109/10; G05D 1/242; G05D 1/246
See application file for complete search history.

(56) References Cited

U.S. PATENT DOCUMENTS

| | | | | |
|---|---|---|---|---|
| 7,053,580 | B2* | 5/2006 | Aldred | G05D 1/0255 |
| | | | | 701/1 |
| 7,085,624 | B2* | 8/2006 | Aldred | G05D 1/0242 |
| | | | | 700/254 |
| 9,535,421 | B1* | 1/2017 | Canoso | G05D 1/0214 |
| 9,725,013 | B2* | 8/2017 | Romanov | A47L 11/4011 |
| 10,012,996 | B1* | 7/2018 | Canoso | G05D 1/0231 |
| 10,043,076 | B1* | 8/2018 | Zhang | G06V 10/464 |
| 10,168,709 | B2* | 1/2019 | Kleiner | G05D 1/223 |
| 10,279,930 | B2* | 5/2019 | Hukkeri | G01S 15/89 |
| 10,310,507 | B2* | 6/2019 | Kleiner | G05D 1/0044 |
| 10,394,246 | B2* | 8/2019 | Moshkina-Martinson | |
| | | | | A47L 9/2894 |
| 10,422,648 | B2* | 9/2019 | Afrouzi | G01C 21/30 |
| 10,551,843 | B2* | 2/2020 | Yee | A47L 9/2831 |
| 10,638,906 | B2* | 5/2020 | Herron | G05D 1/024 |
| 10,761,537 | B1* | 9/2020 | Ready-Campbell | |
| | | | | G05D 1/0212 |
| 10,788,836 | B2* | 9/2020 | Ebrahimi Afrouzi | |
| | | | | G05D 1/0214 |
| 10,796,562 | B1* | 10/2020 | Wild | G08B 19/00 |
| 10,809,071 | B2* | 10/2020 | Afrouzi | G01C 21/1652 |
| 10,882,187 | B2* | 1/2021 | Li | B25J 9/0003 |
| 10,906,185 | B2* | 2/2021 | Deyle | B25J 9/1697 |
| 10,913,160 | B2* | 2/2021 | Deyle | G05D 1/0212 |
| 10,918,255 | B2* | 2/2021 | Song | A47L 9/2805 |
| 10,962,647 | B2* | 3/2021 | Shin | G01S 17/04 |
| 10,991,242 | B2* | 4/2021 | Taylor | H04Q 9/00 |
| 11,037,320 | B1* | 6/2021 | Ebrahimi Afrouzi | G01C 3/085 |
| 11,069,082 | B1* | 7/2021 | Ebrahimi Afrouzi | H04N 23/56 |
| 11,153,503 | B1* | 10/2021 | Ebrahimi Afrouzi | H04N 7/183 |
| 11,199,853 | B1* | 12/2021 | Afrouzi | B25J 13/006 |
| 11,215,461 | B1* | 1/2022 | Ebrahimi Afrouzi | |
| | | | | G01S 7/4808 |
| 11,241,791 | B1* | 2/2022 | Ebrahimi Afrouzi | G01P 3/68 |
| 11,274,929 | B1* | 3/2022 | Afrouzi | G06T 7/30 |
| 11,314,260 | B2* | 4/2022 | Kleiner | G05D 1/225 |
| 11,325,250 | B2* | 5/2022 | Deyle | B25J 18/04 |
| 11,348,269 | B1* | 5/2022 | Ebrahimi Afrouzi | G01S 17/48 |
| 11,398,040 | B2* | 7/2022 | Asmari | G06T 7/593 |
| 11,435,192 | B1* | 9/2022 | Ebrahimi Afrouzi | G01S 17/89 |
| 11,435,746 | B1* | 9/2022 | Ebrahimi Afrouzi | |
| | | | | G05D 1/0212 |
| 11,449,061 | B2* | 9/2022 | Ebrahimi Afrouzi | |
| | | | | A47L 11/4011 |
| 11,449,063 | B1* | 9/2022 | Ebrahimi Afrouzi | |
| | | | | G05D 1/0246 |
| 11,449,064 | B1* | 9/2022 | Ebrahimi Afrouzi | |
| | | | | G05D 1/0231 |
| 11,467,587 | B2* | 10/2022 | Ebrahimi Afrouzi | G06F 3/167 |
| 11,481,918 | B1* | 10/2022 | Ebrahimi Afrouzi | |
| | | | | A47L 11/4008 |
| 11,499,832 | B1* | 11/2022 | Ebrahimi Afrouzi | |
| | | | | G01C 21/206 |
| 11,548,159 | B1* | 1/2023 | Ebrahimi Afrouzi | G06T 7/13 |
| 11,656,082 | B1* | 5/2023 | Ebrahimi Afrouzi | |
| | | | | G05D 1/0272 |
| | | | | 700/259 |
| 11,657,531 | B1* | 5/2023 | Ebrahimi Afrouzi | G06V 10/44 |
| | | | | 382/284 |
| 11,669,994 | B1* | 6/2023 | Ebrahimi Afrouzi | G06T 7/593 |
| | | | | 348/239 |
| 11,724,399 | B2* | 8/2023 | Deyle | B25J 13/006 |
| | | | | 700/258 |

(56) References Cited

U.S. PATENT DOCUMENTS

| | | | | |
|---|---|---|---|---|
| 11,740,634 | B2* | 8/2023 | Kleiner | G05D 1/0044 701/2 |
| 11,835,343 | B1* | 12/2023 | Ebrahimi Afrouzi | G05D 1/0272 |
| 11,892,311 | B2* | 2/2024 | Lee | G06T 1/0007 |
| 11,899,463 | B1* | 2/2024 | Ebrahimi Afrouzi | G05D 1/0225 |
| 11,927,965 | B2* | 3/2024 | Ebrahimi Afrouzi | G06F 3/04845 |
| 11,961,252 | B1* | 4/2024 | Ebrahimi Afrouzi | G06F 3/0346 |
| 12,070,847 | B1* | 8/2024 | Ebrahimi Afrouzi | B25J 9/1684 |
| 12,092,467 | B1* | 9/2024 | Ebrahimi Afrouzi | G01C 21/32 |
| 12,094,145 | B2* | 9/2024 | Ebrahimi Afrouzi | G06T 7/136 |
| 12,111,664 | B1* | 10/2024 | Ebrahimi Afrouzi | G01C 21/005 |
| 12,134,192 | B2* | 11/2024 | Deyle | G01C 21/206 |
| 12,135,564 | B2* | 11/2024 | Ebrahimi Afrouzi | A47L 9/0477 |
| 12,235,650 | B2* | 2/2025 | Kleiner | A47L 9/2894 |
| 12,235,659 | B2* | 2/2025 | Ebrahimi Afrouzi | A47L 9/30 |
| 12,266,129 | B1* | 4/2025 | Ebrahimi Afrouzi | G06T 7/90 |
| 12,298,110 | B2* | 5/2025 | Ebrahimi Afrouzi | H04N 23/56 |
| 12,399,501 | B2* | 8/2025 | Ebrahimi Afrouzi | G01C 21/12 |
| 2002/0153184 | A1* | 10/2002 | Song | A47L 9/2852 180/167 |
| 2003/0030398 | A1* | 2/2003 | Jacobs | G05D 1/0274 318/568.12 |
| 2004/0168148 | A1* | 8/2004 | Goncalves | G05D 1/0231 717/104 |
| 2005/0046373 | A1* | 3/2005 | Aldred | A47L 9/009 318/580 |
| 2005/0085947 | A1* | 4/2005 | Aldred | G05D 1/0272 700/253 |
| 2005/0131581 | A1* | 6/2005 | Sabe | G05D 1/0251 700/245 |
| 2005/0182518 | A1* | 8/2005 | Karlsson | G06V 10/84 700/253 |
| 2006/0165276 | A1* | 7/2006 | Hong | G05D 1/0274 382/153 |
| 2007/0027579 | A1* | 2/2007 | Suzuki | G05D 1/0251 700/245 |
| 2007/0271011 | A1* | 11/2007 | Lee | G05D 1/028 901/1 |
| 2008/0027591 | A1* | 1/2008 | Lenser | G05D 1/0038 701/28 |
| 2008/0039974 | A1* | 2/2008 | Sandin | G05D 1/0255 901/46 |
| 2010/0094460 | A1* | 4/2010 | Choi | G05D 1/0274 700/251 |
| 2011/0098923 | A1* | 4/2011 | Lee | G01C 15/00 701/532 |
| 2011/0178709 | A1* | 7/2011 | Park | G09B 29/00 901/1 |
| 2011/0202175 | A1* | 8/2011 | Romanov | B25J 13/08 700/250 |
| 2011/0268349 | A1* | 11/2011 | Choi | G06V 20/36 382/153 |
| 2011/0288684 | A1* | 11/2011 | Farlow | B25J 19/023 901/1 |
| 2012/0173018 | A1* | 7/2012 | Allen | B25J 11/008 700/245 |
| 2012/0197439 | A1* | 8/2012 | Wang | B25J 11/009 901/1 |
| 2013/0325244 | A1* | 12/2013 | Wang | G16H 40/67 701/26 |
| 2014/0350839 | A1* | 11/2014 | Pack | G05D 1/0231 901/1 |
| 2015/0185027 | A1* | 7/2015 | Kikkeri | G01C 25/00 701/400 |
| 2015/0362921 | A1* | 12/2015 | Hanaoka | G05D 1/0274 702/159 |
| 2016/0297072 | A1* | 10/2016 | Williams | G05D 1/0234 |
| 2016/0316982 | A1* | 11/2016 | Kim | A47L 9/2857 |
| 2016/0320777 | A1* | 11/2016 | Yun | A47L 11/4011 |
| 2017/0225336 | A1* | 8/2017 | Deyle | B25J 11/008 |
| 2017/0315554 | A1* | 11/2017 | Lee | G05D 1/0219 |
| 2018/0021954 | A1* | 1/2018 | Fischer | G05D 1/0274 700/253 |
| 2018/0039275 | A1* | 2/2018 | Yun | A47L 9/009 |
| 2018/0074508 | A1* | 3/2018 | Kleiner | G05D 1/0274 |
| 2018/0075643 | A1* | 3/2018 | Sequeira | G06T 7/579 |
| 2018/0122086 | A1* | 5/2018 | Lu | G06T 7/246 |
| 2018/0210448 | A1* | 7/2018 | Lee | G05D 1/0214 |
| 2018/0232947 | A1* | 8/2018 | Nehmadi | G01S 7/295 |
| 2018/0284792 | A1* | 10/2018 | Kleiner | G05D 1/2246 |
| 2018/0344115 | A1* | 12/2018 | Shin | A47L 9/2852 |
| 2018/0350086 | A1* | 12/2018 | Sweet, III | G06T 15/08 |
| 2019/0011929 | A1* | 1/2019 | Maeno | G05D 1/0274 |
| 2019/0035100 | A1* | 1/2019 | Ebrahimi Afrouzi | G06N 3/045 |
| 2019/0052852 | A1* | 2/2019 | Schick | G06T 7/593 |
| 2019/0061156 | A1* | 2/2019 | Li | G05D 1/027 |
| 2019/0121361 | A1* | 4/2019 | Afrouzi | G01C 21/206 |
| 2019/0248002 | A1* | 8/2019 | Deyle | B25J 19/023 |
| 2019/0248013 | A1* | 8/2019 | Deyle | B25J 13/006 |
| 2019/0248014 | A1* | 8/2019 | Deyle | B25J 13/006 |
| 2019/0248016 | A1* | 8/2019 | Deyle | B25J 13/006 |
| 2019/0250625 | A1* | 8/2019 | Kleiner | G05D 1/0219 |
| 2020/0069134 | A1* | 3/2020 | Ebrahimi Afrouzi | A47L 9/0472 |
| 2020/0218279 | A1* | 7/2020 | Liu | G05D 1/0238 |
| 2020/0225673 | A1* | 7/2020 | Ebrahimi Afrouzi | A47L 11/4011 |
| 2020/0409376 | A1* | 12/2020 | Ebrahimi Afrouzi | G05D 1/0214 |
| 2020/0409382 | A1* | 12/2020 | Herman | A47L 9/2889 |
| 2021/0089040 | A1* | 3/2021 | Ebrahimi Afrouzi | G05D 1/0248 |
| 2021/0228039 | A1* | 7/2021 | Brouwers | G05D 1/0242 |
| 2021/0240195 | A1* | 8/2021 | Atherton | G05D 1/0038 |
| 2021/0365040 | A1* | 11/2021 | Tomono | G05D 1/024 |
| 2022/0065634 | A1* | 3/2022 | Kitaura | G01C 21/3807 |
| 2022/0066456 | A1* | 3/2022 | Ebrahimi Afrouzi | G06F 3/04883 |
| 2022/0080592 | A1* | 3/2022 | Karapetyan | G05D 1/0227 |
| 2022/0187841 | A1* | 6/2022 | Ebrahimi Afrouzi | G05D 1/0242 |
| 2022/0234194 | A1* | 7/2022 | Deyle | B25J 18/04 |
| 2022/0317693 | A1* | 10/2022 | Kleiner | G05D 1/246 |
| 2023/0367324 | A1* | 11/2023 | Ebrahimi Afrouzi | A47L 9/2826 |
| 2023/0384791 | A1* | 11/2023 | Kleiner | G05D 1/246 |
| 2024/0118091 | A1* | 4/2024 | Ebrahimi Afrouzi | G01C 21/206 |
| 2024/0119614 | A1* | 4/2024 | Ebrahimi Afrouzi | A47L 11/4011 |
| 2024/0126265 | A1* | 4/2024 | Ebrahimi Afrouzi | A47L 9/0686 |
| 2024/0142994 | A1* | 5/2024 | Ebrahimi Afrouzi | A47L 11/4091 |
| 2024/0192690 | A1* | 6/2024 | Ebrahimi Afrouzi | B25J 13/087 |
| 2024/0284053 | A1* | 8/2024 | Ebrahimi Afrouzi | H04N 7/183 |
| 2024/0310851 | A1* | 9/2024 | Ebrahimi Afrouzi | G01S 17/87 |
| 2024/0324838 | A1* | 10/2024 | Ebrahimi Afrouzi | G05D 1/2446 |
| 2025/0172942 | A1* | 5/2025 | Ebrahimi Afrouzi | A47L 9/0477 |
| 2025/0189972 | A1* | 6/2025 | Ebrahimi Afrouzi | G05D 1/246 |
| 2025/0231568 | A1* | 7/2025 | Kleiner | G05D 1/0044 |
| 2025/0264307 | A1* | 8/2025 | Ebrahimi Afrouzi | H04N 23/56 |

OTHER PUBLICATIONS

"Autonomous robotic SLAM-based indoor navigation for high resolution sampling with complete coverage;" Wieser et al. 2014 IEEE/ION Position, Location and Navigation Symposium—PLANS 2014 (2014, pp. 945-951); Aug. 1, 2014. (Year: 2014).*

(56) References Cited

OTHER PUBLICATIONS

"Autonomous Navigation of Quadrupeds Using Coverage Path Planning;" Becoy et al., Arxiv ID: 2504. 17880; Apr. 24, 2025. (Year: 2025).*

* cited by examiner

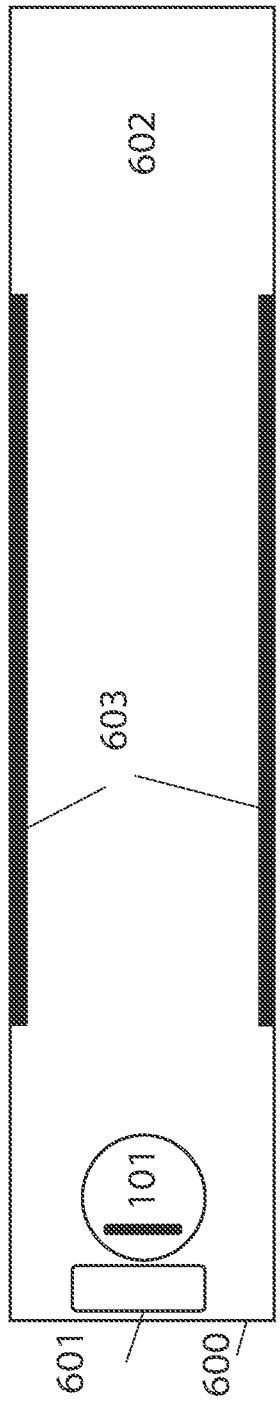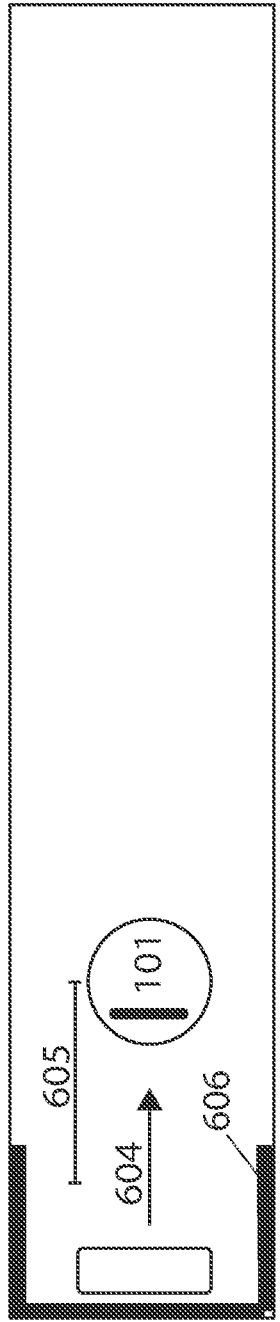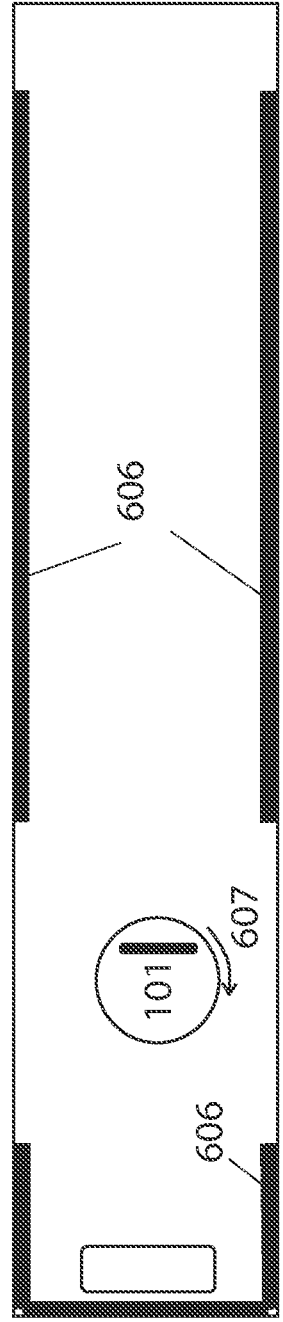

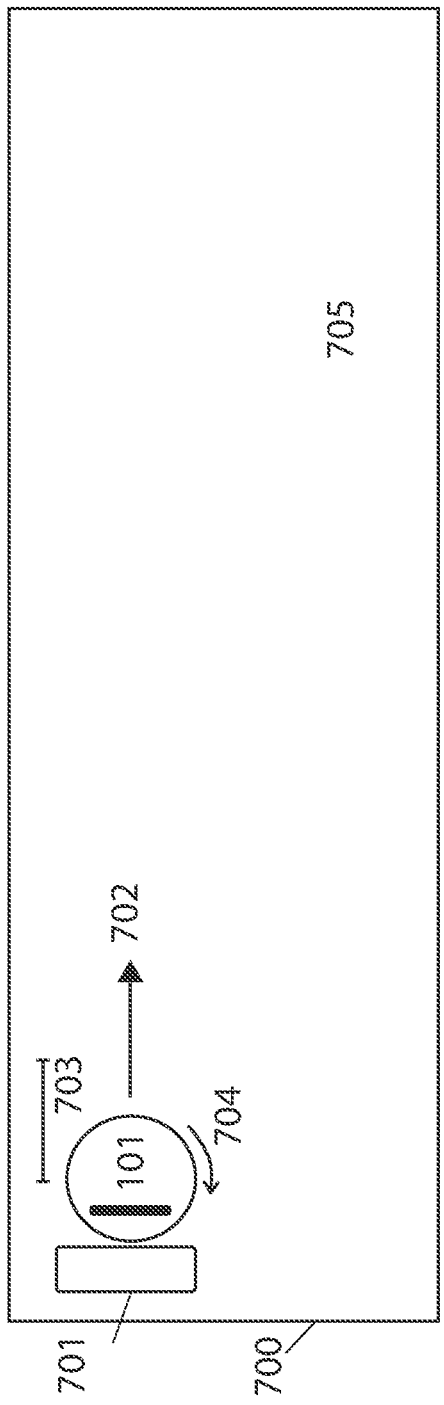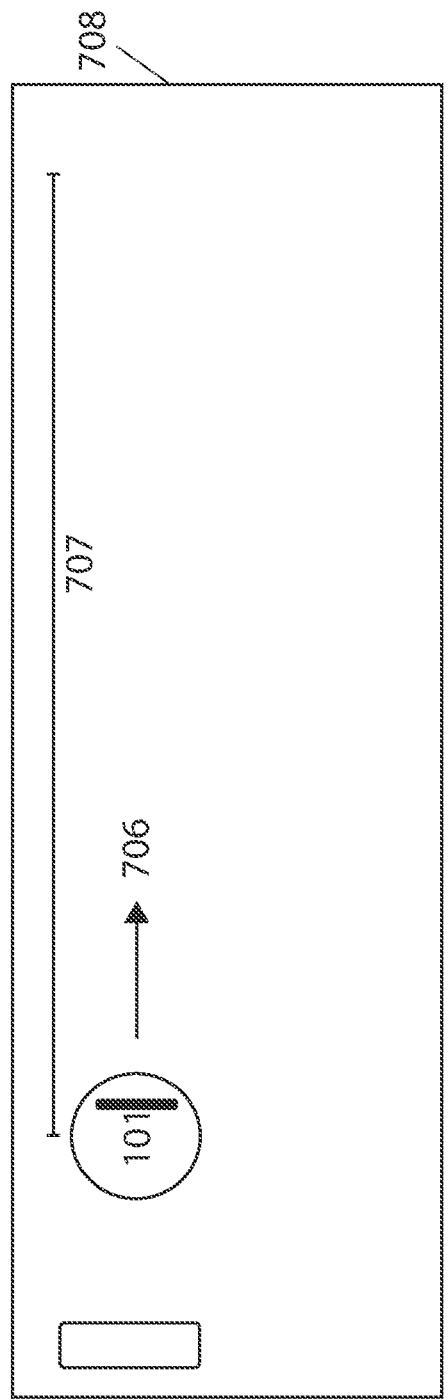

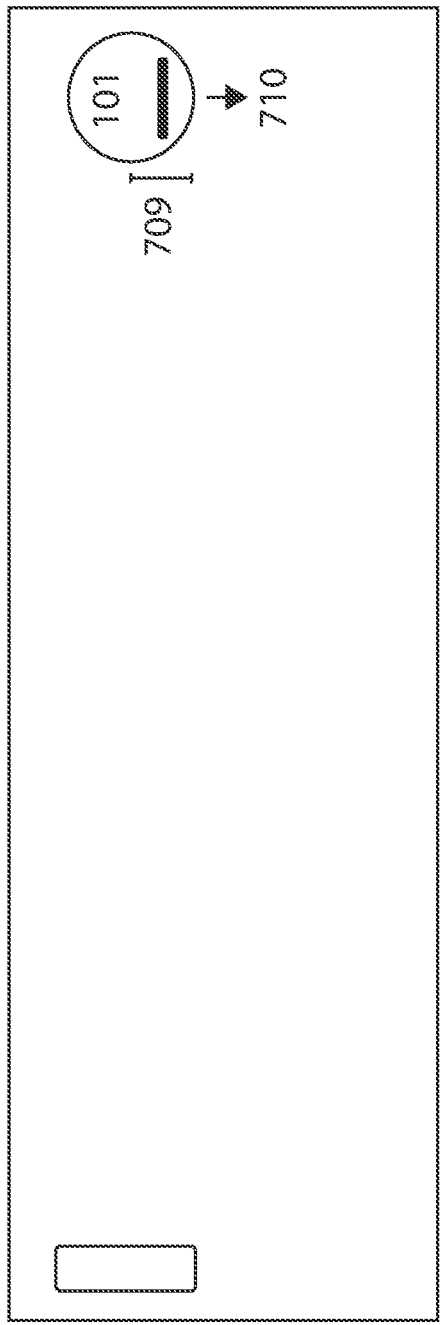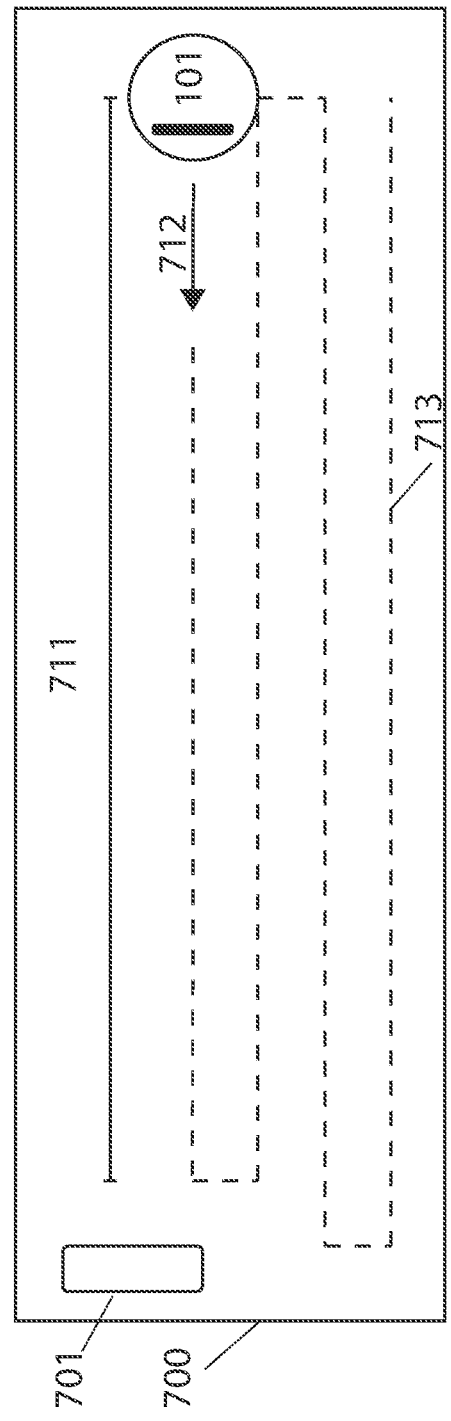

FIG. 9
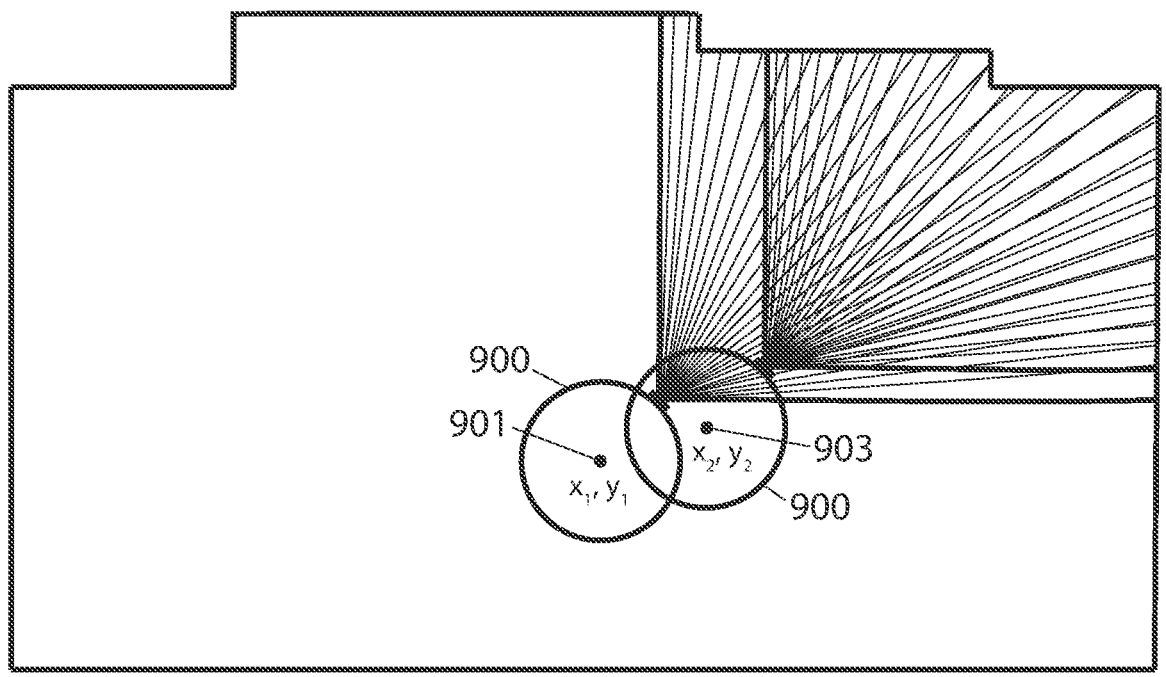
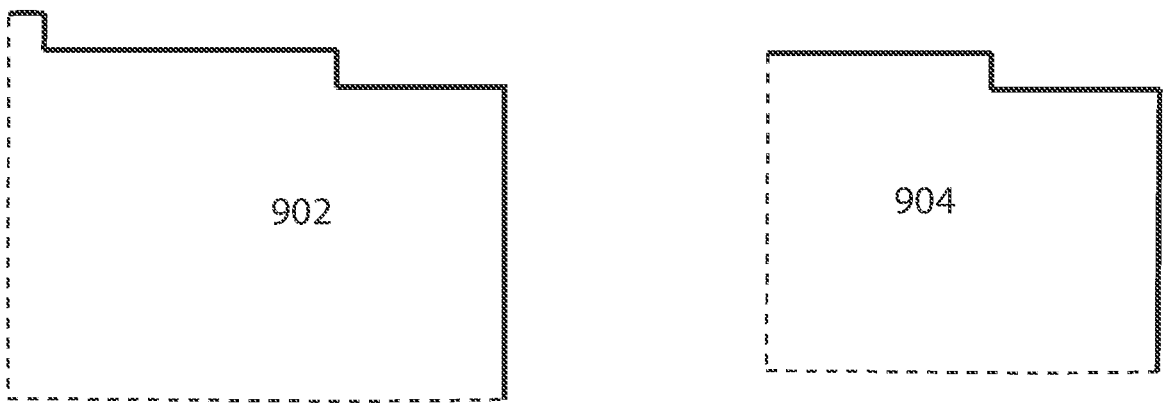

METHOD FOR CONSTRUCTING A MAP WHILE PERFORMING WORK

CROSS-REFERENCE TO RELATED APPLICATIONS

This application is a Continuation of U.S. non-provisional patent application Ser. No. 17/535,968, filed Nov. 26, 2021, which is a Continuation of U.S. non-provisional application Ser. No. 16/597,945, filed Oct. 10, 2019, which is a Continuation of U.S. non-provisional application Ser. No. 16/163,562, filed Oct. 17, 2018, which claims the benefit of U.S. Provisional Patent Application Nos. 62/573,591, filed Oct. 17, 2017; 62/637,185, filed Mar. 1, 2018; 62/613,005, filed Jan. 2, 2018; 62/599,216, filed Dec. 15, 2017; 62/573,579, filed Oct. 17, 2017; 62/637,156, filed Mar. 1, 2018; 62/740,558, filed Oct. 3, 2018; 62/573,598, filed Oct. 17, 2017; 62/591,217, filed Nov. 28, 2017; 62/616,928, filed Jan. 12, 2018; 62/614,449, filed Jan. 7, 2018; 62/590,205, filed Nov. 22, 2017; 62/666,266, filed May 3, 2018; 62/661,802, filed Apr. 24, 2018; 62/631,050, filed Feb. 15, 2018; 62/746,688, filed Oct. 17, 2018; 62/740,573, filed Oct. 3, 2018; and 62/740,580, filed Oct. 3, 2018; 62/640,444, filed Mar. 8, 2018; 62/648,026, filed Mar. 26, 2018; 62/655,494, filed Apr. 10, 2018; 62/665,095, filed May 1, 2018; 62/674,173, filed May 21, 2018; 62/688,497, filed Jun. 22, 2018, each of which is hereby incorporated herein by reference.

In this patent, certain U.S. patents, U.S. patent applications, or other materials (e.g., articles) have been incorporated by reference. Specifically, U.S. patent application Ser. No. 15/243,783 (now U.S. Pat. 9,972,098), 62/208,791, Ser. No. 15/224,442, Ser. No. 15/674,310, Ser. No. 15/683,255, Ser. No. 15/949,708, Ser. No. 16/109,617, Ser. No. 16/048,185, Ser. No. 16/048,179, Ser. No. 15/614,284, Ser. No. 15/272,752, U.S. Patent App. titled Discovering and Plotting the Boundary of an Enclosure, by the same applicant, filed on the same day as this patent filing, and U.S. Patent App. titled Methods for Finding the Perimeter of a Place Using Observed Coordinates, by the same applicant, filed on the same day as this patent filing are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to computational techniques for processing data related to a map of the environment, and more particularly, to computational techniques for mapping an environment.

BACKGROUND

For autonomous or semi-autonomous robotic devices to operate independently or with minimal input and/or external control within an environment, a mapping process for autonomous construction of a map of the working environment is helpful.

One method for construction of a map is Simultaneous Localization and Mapping (SLAM), which relies on the use of large amounts of captured points or features to construct a map. For example, Virtual SLAM (VSLAM) requires captured features such as circles, arcs, lines, edges, and corners for construction of the map, the features being extracted using image processing techniques. These types of SLAM methods are typically computationally expensive, requiring a powerful CPU or dedicated MCU and are, therefore, expensive to implement. Additionally, they often include probabilistic processing and particle filtering requiring large amounts of memory for storing multiple sets of redundant data. For example, Extended Kalman Filter (EKF) is a technique used in SLAM wherein the pose of the robot and position of features within the map are estimated and stored in a large complete state vector while uncertainties in the estimates are stored in an error covariance matrix. The processing of a large total state vector and covariance matrix of many features requires substantial computational power and memory for storage. In some cases, computational delays can even limit the speed of the robotic device and its task performance. In addition, issues may also arise in data association due to the presence of similar features and performance may be jeopardized if measurement noise covariance matrices are inaccurate.

Furthermore, in cases wherein Laser Distance Sensors (LDS) are used for high rate data collection, mapping may be affected by the functionality of the sensor as it is sensitive to lighting and transparent and reflective objects.

Some mapping solutions also require additional equipment for projecting infrared (IR) light pattern for use in the mapping process. For example, some products use an additional stationary and external device system that projects an IR pattern onto the ceiling or the environment to determine the position of the robotic device.

It is evident these established methods require large amounts of memory, substantial processing power and are expensive to implement. While other mapping methods requiring less cost for implementation and computational power have been introduced, they are limited by, for example, requiring the robotic device to map the environment before being able to perform work within the environment or requiring additional equipment or lacking adequate details on construction of the map.

None of the preceding discussion should be taken as a disclaimer of any of the described techniques, as the present approach may be used in combination with these other techniques in some embodiments.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method executed by a robot, the method including: starting, from a starting position, a work session in which the robot maps a workspace, wherein a front of the robot faces towards a forward direction in a frame of reference of the robot and, while the robot is in the starting position, the front of the robot faces towards a first direction in a frame of reference of the workspace; the robot traversing, from the starting position, to a first position, a first distance from the starting position in a backward direction in the frame of reference of the robot and in a second direction in the frame of reference of the workspace, the backward direction being opposite the forward direction in the frame of reference of the robot, and the second direction being opposite the first direction in the frame of reference of the workspace; after traversing the first distance, the robot rotating; after rotating, the robot traversing a coverage path of at least one area of the workspace, the coverage path including a boustrophedon movement pattern; and the robot cleaning the at least one area of the workspace with a cleaning tool of the robot while traversing the coverage path, the robot traversing the coverage path comprising a repeated iteration of: the robot traversing a linear segment in a third direction in the frame of reference of the workspace; the robot rotating 180 degrees; and the robot traversing a linear segment in a fourth direction in the frame of reference of the workspace, the fourth direction being opposite the third direction; and the robot rotating 180 degrees; wherein each 180 degrees rotation comprises the robot traversing a distance of less than a coverage width of the robot in a direction perpendicular to the linear segments after starting the respective 180 degrees rotation and before finishing the respective 180 degrees rotation.

Some aspects include a method for covering a workspace by a robot, including: the robot starting, from a starting position, a work session in which a processor of the robot maps a workspace while the robot performs work within the work space, wherein: while the robot is in the starting position, a front portion of the robot faces towards a first direction in a frame of reference of the workspace; and a forward direction in a frame of reference of the robot and the first direction are the same direction; the robot traversing, from the starting position, to a first position, a first distance from the starting position, in a backwards direction in the frame of reference of the robot and in a second direction in the frame of reference of the workspace, the backwards direction being opposite the forwards direction in the frame of reference of the robot, and the second direction being opposite the first direction in the frame of reference of the workspace; after traversing the first distance, the robot rotating in a first rotation, placing the robot in an orientation where the forward direction in the frame of reference of the robot aligns with a third direction in the frame of reference of the workspace; after the first rotation, the robot traversing, to a second position, a second distance in the third direction in the frame of reference of the workspace and in the forward direction in the frame of reference of the robot; after traversing the second distance, the robot rotating in a second rotation, placing the robot in an orientation where the forward direction of the robot in the frame of reference of the robot aligns with a fourth direction in the frame of reference of the workspace; and the robot covering the workspace in a boustrophedon path until the robot covers the entire workspace.

Some aspects include a method executed by a robot, including: the robot starting, from a starting position, a session in which the robot cleans a workspace, wherein the robot comprises at least a sensor pointing in a forward direction in a frame of reference of the robot and, while the robot is in the starting position, in a first direction in a frame of reference of the workspace, wherein while the robot is in the starting position, the forward direction and the first direction are the same direction; the robot traversing, from the starting position, to a first position, a first distance from the starting position in a backward direction in the frame of reference of the robot and in a second direction in the frame of reference of the workspace, the backward direction being opposite the forward direction in the frame of reference of the robot, and the second direction being opposite the first direction in the frame of reference of the workspace; after traversing the first distance, the robot rotating in a first rotation, placing the robot in an orientation where the field of view of the sensor points in the second direction in the frame of reference of the workspace; after the first rotation, the robot traversing, to a second position, a second distance in the second direction in the frame of reference of the workspace and in the forward direction in the frame of reference of the robot; after traversing the second distance, the robot rotating in a second rotation, placing the robot in an orientation where the field of view of the sensor points in the first direction in the frame of reference of the work workspace, wherein the second rotation comprises the robot traversing a distance of less than a coverage width of the robot in a direction perpendicular to the first direction and the second direction in the frame of reference of the workspace after starting the second rotation and before finishing the second rotation; and after the second rotation, the robot traversing, to a third position, a third distance in the first direction in the frame of reference of the workspace and in the forward direction in the frame of reference of the robot.

BRIEF DESCRIPTION OF THE DRAWINGS

FIGS. 6A-6F and 7A-7D illustrate a boustrophedon movement pattern that may be executed by a robotic device while mapping the environment in some embodiments.

FIG. 9 illustrates a map of a robotic device for alternative localization scenarios in some embodiments.

DETAILED DESCRIPTION OF CERTAIN EMBODIMENTS

Figure 1A:
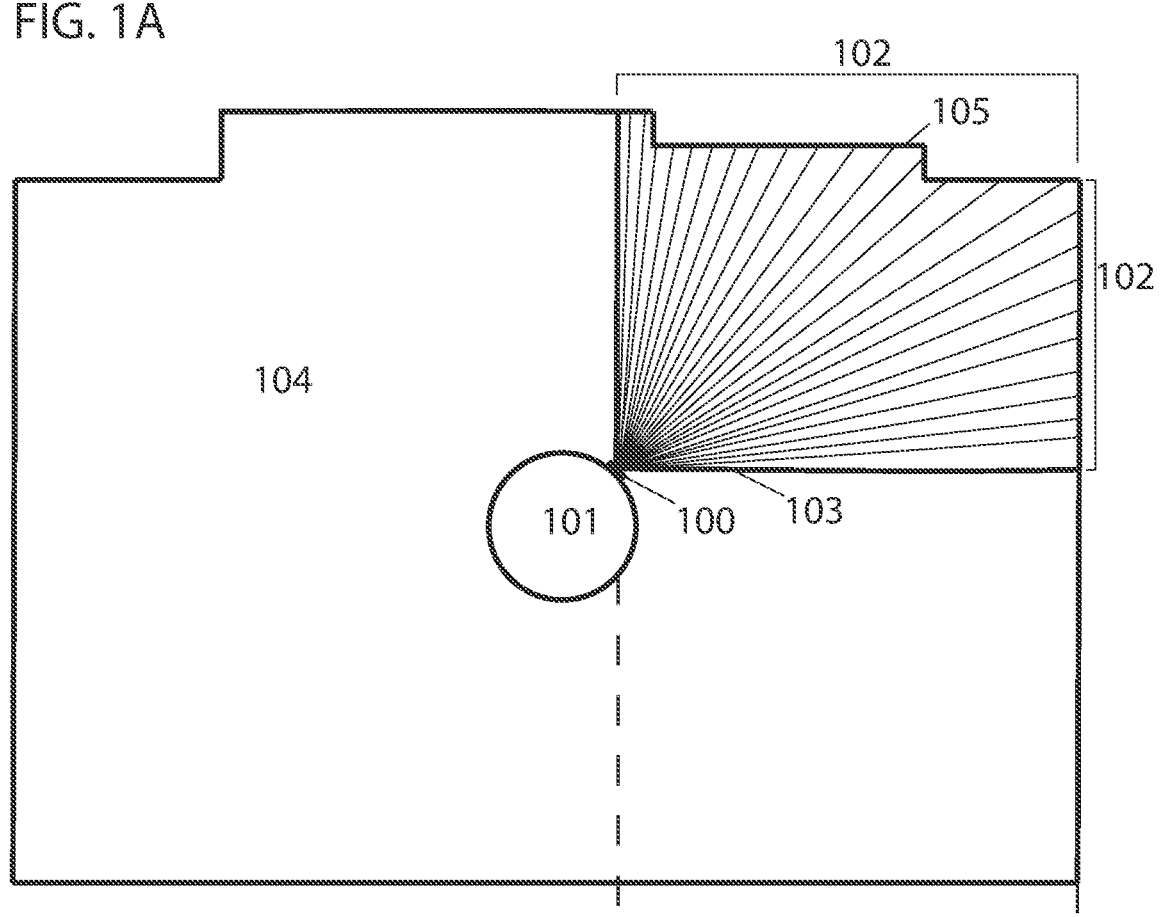
FIGS. 1A and 1B illustrate a 2D map segment constructed from depth measurements taken within a first field of view in some embodiments.

The present techniques will now be described in detail with reference to a few embodiments thereof as illustrated in the accompanying drawings. In the following description, numerous specific details are set forth in order to provide a thorough understanding of the present techniques. It will be apparent, however, to one skilled in the art, that the present techniques may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering trade offs may warrant systems that only afford a subset of the benefits described herein or that will be apparent to one of ordinary skill in the art.

The steps described below may be performed in various settings, such as with a camera or image sensor (e.g., the sensor or the sensor in conjunction with a processor of the robot) or any other type of device capable of perceiving the surroundings installed on a semi-autonomous or autonomous robotic device used to perform tasks such as floor cleaning, lawn mowing, mopping, monitoring, delivering items and/or any other tasks or operations. In some cases, the operations are performed by one or more processors on-board of a robot, at a base station of a robot, in a remote data center in communication with a robot, or a combination there, e.g., with some computational acts being offloaded for remote processing.

In some embodiments, a robot or robotic device may include one or more autonomous or semi-autonomous devices comprising communication, an actuator, mobility, and/or processing components. For example, a robot or robotic device may include a casing (like a shell), a chassis, a set of wheels, a suspension system, a motor configured to drive the wheels, a receiver that acquires signals transmitted from, for example, a transmitting beacon, a transmitter that transmits signals, a processor (like a controller that processes and/or controls motors and other actions of the robotic device), network (e.g., wireless) communications, power management (like a battery), USB ports etc., and one or more clock or synchronizing device. In addition, the robotic device may include a mapping module, localization module, path planning module, user interface module and scheduling module. The robot or robotic device may further include tactile sensors, depth sensors such as LDS, time-of-flight sensor, depth camera, and the like, movement sensors, such as an odometer, inertial measurement units (like with a three axis accelerometer and a three axis gyroscope), optical flow sensor (e.g., a visual odometry sensor facing the ground), and the like, and other types of sensors useful to the functionality of the robotic device. The list of components presented is not meant to be an exhaustive list of possible components of a robotic device but is rather an example of possible components a robot or robotic device may have. Components and modules may be separate and combined with the main processor and/or control system of the robotic device or may be integrated within the main processor and/or control system of the robotic device. Other types of robots or robotic devices with other configurations may also be used.

Some embodiments afford a processor of a robotic device constructing a map of the environment using data from one or more cameras while the robotic device performs work within recognized areas of the environment. The working environment may include, but is not limited to (a phrase which is not here or anywhere else in this document to be read as implying other lists are limiting), furniture, obstacles, static objects, moving objects, walls, ceilings, fixtures, perimeters, items, components of any of the above, and/or other articles. The environment may be closed on all sides or have one or more openings, open sides, and/or open sections and may be of any shape. In some embodiments, the robotic device may include an on-board camera, such as one with zero-degrees of freedom of actuated movement relative to the robotic device (which may itself have three degrees of freedom relative to an environment), or some embodiments may have more or fewer degrees of freedom; e.g., in some cases, the camera may scan back and forth relative to the robotic device.

A camera as described herein may include, but is not limited to, various optical and non-optical imaging devices, like a depth camera, stereovision camera, time-of-flight camera, or any other type of camera that outputs data from which depth to objects can be inferred over a field of view, or any other type of camera capable of generating a pixmap, or any device whose output data may be used in perceiving the environment. A camera may also be combined with an infrared (IR) illuminator (such as a structured light projector), and depth to objects may be inferred from images captured of objects onto which IR light is projected (e.g., based on distortions in a pattern of structured light). Examples of methods for estimating depths to objects using at least one IR laser, at least one image sensor, and an image processor are detailed in U.S. patent application Ser. No. 15/243,783, 62/208,791, Ser. No. 15/224,442, and Ser. No. 15/674,310, the entire contents of each of which are hereby incorporated by reference. Other imaging devices capable of observing depth to objects may also be used, such as ultrasonic sensors, sonar, LIDAR, and LADAR devices. Thus, various combinations of one or more cameras and sensors may be used.

In some embodiments, gaps in the plotted boundary of the enclosure may be identified by one or more processors of the robotic device and further explored by one or more processors of the robotic device directing the camera until a complete (or more complete) closed loop boundary of the enclosure is plotted. In some embodiments, beacons are not required and the methods and apparatuses work with minimal or reduced processing power in comparison to traditional methods, which is not to suggest that any other described feature is required.

In some embodiments, a camera, installed on a robotic device, for example, measures the depth from the camera to objects within a first field of view. In some embodiments, a processor of the robotic device constructs a first segment of the map from the depth measurements taken within the first field of view. The processor may establish a first recognized area within the working environment, bound by the first segment of the map and the outer limits of the first field of view. In some embodiments, the robotic device begins to perform work within the first recognized area. As the robotic device with attached camera rotates and translates within the first recognized area, the camera continuously takes depth measurements to objects within the field of view of the camera. Assuming the frame rate of the camera is fast enough to capture more than one frame of data in the time it takes the robotic device to rotate the width of the frame, a portion of data captured within each field of view overlaps with a portion of data captured within the preceding field of view. As the robotic device moves to observe a new field of view, in some embodiments, the processor adjusts measurements from previous fields of view to account for movement of the robotic device. The processor, in some embodiments, uses data from devices such as an odometer, gyroscope and/or optical encoder to determine movement of the robotic device with attached camera.

In some embodiments, the processor compares depth measurements taken within the second field of view to those taken within the first field of view in order to find the overlapping measurements between the two fields of view. The processor may use different methods to compare measurements from overlapping fields of view. An area of overlap between the two fields of view is identified (e.g., determined) when (e.g., during evaluation a plurality of candidate overlaps) a number of consecutive (e.g., adjacent in pixel space) depths from the first and second fields of view are equal or close in value. Although the value of overlapping depth measurements from the first and second fields of view may not be exactly the same, depths with similar values, to within a tolerance range of one another, can be identified (e.g., determined to correspond based on similarity of the values). Furthermore, identifying matching patterns in the value of depth measurements within the first and second fields of view can also be used in identifying the area of overlap. For example, a sudden increase then decrease in the depth values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the perceived depths, can also be used to estimate the area of overlap. A Jacobian and Hessian matrix can be used to identify such similarities.

In some embodiments, thresholding may be used in identifying overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric such as the Szymkiewicz-Simpson coefficient can be used to indicate how good of an overlap there is between the two sets of depth measurements. In some embodiments, the angular speed and time between consecutive fields of view may be used to estimate the area of overlap. Or some embodiments may determine an overlap with a convolution. Some embodiments may implement a kernel function that determines an aggregate measure of differences (e.g., a root mean square value) between some or all of a collection of adjacent depth readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied.

In some embodiments, images may be preprocessed before determining overlap. For instance, some embodiments may infer an amount of displacement of the robot between images, e.g., by integrating readings from an inertial measurement unit or odometer (in some cases after applying a Kalman filter), and then transform the origin for vectors in one image to match an origin for vectors in the other image based on the measured displacement, e.g., by subtracting a displacement vector from each vector in the subsequent image. Further, some embodiments may downres images to afford faster matching, e.g., by selecting every other, every fifth, or more or fewer vectors, or by averaging adjacent vectors to form two lower-resolution versions of the images to be aligned. The resulting alignment may then be applied to align the two higher resolution images.

In some embodiments, computations may be expedited based on a type of movement of the robot between images. For instance, some embodiments may determine if the robot's displacement vector between images has less than a threshold amount of vertical displacement (e.g., is zero). In response, some embodiments may apply the above described convolution in with a horizontal stride and less or zero vertical stride, e.g., in the same row of the second image from which vectors are taken in the first image to form the kernel function.

In some embodiments, the processor expands the number of overlapping depth measurements to include a predetermined (or dynamically determined) number of depth measurements recorded immediately before and after (or spatially adjacent) the identified overlapping depth measurements. Once an area of overlap is identified (e.g., as a bounding box of pixel positions or threshold angle of a vertical plane at which overlap starts in each field of view), the processor constructs a larger field of view by combining the two fields of view using the overlapping depth measurements as attachment points. Combining may include transforming vectors with different origins into a shared coordinate system with a shared origin, e.g., based on an amount of translation or rotation of a depth sensing device between frames, for instance, by adding a translation or rotation vector to depth vectors. The transformation may be performed before, during, or after combining. The method of using the camera to perceive depths within consecutively overlapping fields of view and the processor to identify and combine overlapping depth measurements is repeated, e.g., until all areas of the environment are discovered and a map is constructed.

In some embodiments, a processor (or set thereof) on the robot, a remote computing system in a data center, or both in coordination, may translate depth measurements from on-board sensors of the robot from the robot's (or the sensor's, if different) frame of reference, which may move relative to a room, to the room's frame of reference, which may be static. In some embodiments, vectors may be translated between the frames of reference with a Lorentz transformation or a Galilean transformation. In some cases, the translation may be expedited by engaging a basic linear algebra subsystem (BLAS) of a processor of the robot.

In some embodiments, the robot's frame of reference may move with one, two, three, or more degrees of freedom relative to that of the room, e.g., some frames of reference for some types of sensors may both translate horizontally in two orthogonal directions as the robot moves across a floor and rotate about an axis normal to the floor as the robot turns. The "room's frame of reference" may be static with respect to the room, or as designation and similar designations are used herein, may be moving, as long as the room's frame of reference serves as a shared destination frame of reference to which depth vectors from the robot's frame of reference are translated from various locations and orientations (collectively, positions) of the robot. Depth vectors may be expressed in various formats for each frame of reference, such as with the various coordinate systems described above. (A data structure need not be labeled as a vector in program code to constitute a vector, as long as the data structure encodes the information that constitutes a vector.) In some cases, scalars of vectors may be quantized, e.g., in a grid, in some representations. Some embodiments may translate vectors from non-quantized or relatively granularly quantized representations into quantized or coarser quantizations, e.g., from a sensor's depth measurement to 16 significant digits to a cell in a bitmap that corresponds to 8 significant digits in a unit of distance. In some embodiments, a collection of depth vectors may correspond to a single location or pose of the robot in the room, e.g., a depth image, or in some cases, each depth vector may potentially correspond to a different pose of the robot relative to the room.

The resulting constructed map described above may be encoded in various forms. For instance, some embodiments may construct a point cloud of two dimensional or three dimensional points by transforming each of the vectors into a vector space with a shared origin, e.g., based on the above-described displacement vectors, in some cases with displacement vectors refined based on measured depths. Or some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when mapping. Vectors need not be labeled as "vectors" in program code to constitute vectors, which is not to suggest that other mathematical constructs are so limited. In some embodiments, vectors may be encoded as tuples of scalars, as entries in a relational database, as attributes of an object, etc. Similarly, it should be emphasized that images need not be displayed or explicitly labeled as such to constitute images. Moreover, sensors may undergo some movement while capturing a given image, and the pose of a sensor corresponding to a depth image may, in some cases, be a range of poses over which the depth image is captured.

In some embodiments, due to measurement noise, discrepancies between the value of overlapping depth measurements from a first field of view and a second field of view may exist and the values of the overlapping depths may not be the exact same. In such cases, new depths may be calculated, or some of the depths may be selected as more accurate than others. For example, the overlapping depths from the first field of view and the second field of view (or more fields of view where more images overlap, like more than three, more than five, or more than 10) may be combined using a moving average (or some other measure of central tendency may be applied, like a median or mode) and adopted as the new depths for the area of overlap. The minimum sum of errors may also be used to adjust and calculate new depths for the overlapping area to compensate for the lack of precision between overlapping depths perceived within the first and second fields of view. By way of further example, the minimum mean squared error may be used to provide a more precise estimate of depths within the overlapping area. Other mathematical methods may also be used to further process the depths within the area of overlap, such as split and merge algorithm, incremental algorithm, Hough Transform, line regression, Random Sample Consensus, Expectation-Maximization algorithm, or curve fitting, for example, to estimate more realistic depths given the overlapping depths perceived within the first and second fields of view. The calculated depths are used as the new depth values for the overlapping depths identified. In another embodiment, the k-nearest neighbors algorithm can be used where each new depth is calculated as the average of the values of its k-nearest neighbors. These mathematical methods are not an exhaustive list of methods which may be used to process depth measurements, but provide an example of types of methods which may be used. Furthermore, mathematical methods may be combined.

Some embodiments may implement DB-SCAN on depths and related values like pixel intensity, e.g., in a vector space that includes both depths and pixel intensities corresponding to those depths, to determine a plurality of clusters, each corresponding to depth measurements of the same feature of an object. Some embodiments may execute a density-based clustering algorithm, like DBSCAN, to establish groups corresponding to the resulting clusters and exclude outliers. To cluster according to depth vectors and related values like intensity, some embodiments may iterate through each of the depth vectors and designate a depth vectors as a core depth vector if at least a threshold number of the other depth vectors are within a threshold distance in the vector space (which may be higher than three dimensional in cases where pixel intensity is included). Some embodiments may then iterate through each of the core depth vectors and create a graph of reachable depth vectors, where nodes on the graph are identified in response to non-core corresponding depth vectors being within a threshold distance of a core depth vector in the graph, and in response to core depth vectors in the graph being reachable by other core depth vectors in the graph, where to depth vectors are reachable from one another if there is a path from one depth vector to the other depth vector where every link and the path is a core depth vector and is it within a threshold distance of one another. The set of nodes in each resulting graph, in some embodiments, may be designated as a cluster, and points excluded from the graphs may be designated as outliers that do not correspond to clusters.

Some embodiments may then determine the centroid of each cluster in the spatial dimensions of an output depth vector for constructing floor plan maps. In some cases, all neighbors have equal weight and in other cases the weight of each neighbor depends on its distance from the depth considered or (i.e., and/or) similarity of pixel intensity values. In some embodiments, the k-nearest neighbors algorithm is only applied to overlapping depths with discrepancies. In some embodiments, a first set of readings is fixed and used as a reference while the second set of readings, overlapping with the first set of readings, is transformed to match the fixed reference. In some embodiments, the transformed set of readings is combined with the fixed reference and used as the new fixed reference. In another embodiment, only the previous set of readings is used as the fixed reference. Initial estimation of a transformation function to align the newly read data to the fixed reference is iteratively revised in order to produce minimized distances from the newly read data to the fixed reference. The transformation function may be the sum of squared differences between matched pairs from the newly read data and prior readings from the fixed reference. For example, in some embodiments, for each value in the newly read data, the closest value among the readings in the fixed reference is found. In a next step, a point to point distance metric minimization technique is used such that it will best align each value in the new readings to its match found in the prior readings of the fixed reference. One point to point distance metric minimization technique that may be used estimates the combination of rotation and translation using a root mean square. The process is iterated to transform the newly read values using the obtained information. These methods may be used independently or may be combined to improve accuracy. In some embodiments, the adjustment applied to overlapping depths within the area of overlap is applied to other depths beyond the identified area of overlap, where the new depths within the overlapping area are considered ground truth when making the adjustment.

In some embodiments, a modified RANSAC approach is used where any two points, one from each data set, are connected by a line. A boundary is defined with respect to either side of the line. Any points from either data set beyond the boundary are considered outliers and are excluded. The process is repeated using another two points. The process is intended to remove outliers to achieve a higher probability of being the true distance to the perceived wall. Consider an extreme case where a moving object is captured in two frames overlapping with several frames captured without the moving object. The approach described or RANSAC method may be used to reject data points corresponding to the moving object. This method or a RANSAC method may be used independently or combined with other processing methods described above.

In some instances where linear algebra is used, Basic Linear Algebra Subprograms (BLAS) are implemented to carry out operations such as vector addition, vector norms, scalar multiplication, matrix multiplication, matric transpose, matrix-vector multiplication, linear combinations, dot products, cross products, and the like.

In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats.

The robotic device may, for example, use the map to autonomously navigate the environment during operation, e.g., accessing the map to determine that a candidate route is blocked by an obstacle denoted in the map, to select a route with a route-finding algorithm from a current point to a target point, or the like. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, a new map is constructed at each use, or an extant map is updated based on newly acquired data.

In some embodiments, the processor uses measured movement of the robotic device with attached camera to find the overlap between depth measurements taken within the first field of view and the second field of view. In other embodiments, the measured movement is used to verify the identified overlap between depth measurements taken within overlapping fields of view. In some embodiments, the area of overlap identified is verified if the identified overlap is within a threshold angular distance of the overlap identified using at least one of the method described above. In some embodiments, the processor uses the measured movement to choose a starting point for the comparison between measurements from the first field of view and measurements from the second field of view. For example, the processor uses the measured movement to choose a starting point for the comparison between measurements from the first field of view and measurements from the second field of view. The processor iterates using a method such as that described above to determine the area of overlap. The processor verifies the area of overlap if it is within a threshold angular distance of the overlap estimated using measured movement.

In some cases, a confidence score is calculated for overlap determinations, e.g., based on an amount of overlap and aggregate amount of disagreement between depth vectors in the area of overlap in the different fields of view, and the above Bayesian techniques down-weight updates to priors based on decreases in the amount of confidence. In some embodiments, the size of the area of overlap is used to determine the angular movement and is used to adjust odometer information to overcome inherent noise of the odometer (e.g., by calculating an average movement vector for the robot based on both a vector from the odometer and a movement vector inferred from the fields of view). The angular movement of the robotic device from one field of view to the next may, for example, be determined based on the angular increment between vector measurements taken within a field of view, parallax changes between fields of view of matching objects or features thereof in areas of overlap, and the number of corresponding depths overlapping between the two fields of view.

Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classifying objects in a field of view as being moveable objects upon detecting a difference of greater than a threshold size.

In some embodiments, IMU measurements in a multi-channel stream indicative of acceleration along three or six axes may be integrated over time to infer a change in pose of the robot, e.g., with a Kalman filter. In some cases, the change in pose may be expressed as a movement vector in the frame of reference of the room through which the robot moves. Some embodiments may localize the robot or map the room based on this movement vector (and contact sensors in some cases) even if the image sensor is inoperative or degraded. In some cases, IMU measurements may be combined with image-based (or other exteroceptive) mapping data in a map or localization determination, e.g., with techniques like those described in Chen et. al "Real-time 3D mapping using a 2D laser scanner and IMU-aided visual SLAM," 2017 IEEE International Conference on Real-time Computing and Robotics (RCAR), DOI: 10.1109/RCAR.2017.8311877, or in Ye et. al, LiDAR and Inertial Fusion for Pose Estimation by Non-linear Optimization, arXiv:1710.07104 [cs.RO], the contents of each of which are hereby incorporated by reference. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

In some embodiments, the movement pattern of the robotic device during the mapping process is a boustrophedon movement pattern. This can be advantageous for mapping the environment. For example, if the robotic device begins in close proximity to a wall of which it is facing and attempts to map the environment by rotating 360 degrees in its initial position, areas close to the robotic device and those far away may not be observed by the sensors as the areas surrounding the robotic device are too close and those far away are too far. Minimum and maximum detection distances may be, for example, 30 and 400 centimeters, respectively. Instead, in some embodiments, the robotic device moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robotic device, in some embodiments, (or sensor thereon if the sensor is configured to rotate independently of the robot) then rotates 180 degrees to face towards the open space of the environment. In doing so, the sensors observe areas in front of the robotic device and within the detection range. In some embodiments, the robot does not translate between the backward movement and completion of the 180 degree turn, or in some embodiments, the turn is executed while the robot translates backward. In some embodiments, the robot completes the 180 degree turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robotic device, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robotic device by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robotic device, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robotic device returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robotic device makes two 180 degree turns separated by some distance, such that movement of the robotic device is a boustrophedon pattern, travelling back and forth across the environment. In some embodiments, the robotic device may not be initially facing a wall of which it is in close proximity with. The robotic device may begin executing the boustrophedon movement pattern from any area within the environment. In some embodiments, the robotic device performs other movement patterns besides boustrophedon alone or in combination.

In other embodiments, the boustrophedon movement pattern (or other coverage path pattern) of the robotic device during the mapping process differs. For example, in some embodiments, the robotic device is at one end of the environment, facing towards the open space. From here, the robotic device moves in a first forward direction (from the perspective of the robot as defined above) by some distance then rotates 90 degrees in a clockwise direction. The processor determines the first forward distance by which the robotic device travels forward by detection of an obstacle by a sensor, such as a wall or furniture. In some embodiments, the first forward distance is predetermined (e.g., and measured by another sensor, like an odometer or by integrating signals from an inertial measurement unit). The robotic device then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robotic vacuum), as the robotic device returns back towards the area it began from, the surface being cleaned overlaps with the surface that was already cleaned. In some cases, this may be desirable. If the distance is too large (e.g., greater than the width of the main brush) some areas of the surface may not be cleaned. For example, for small robotic devices, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robotic devices brush size can be between 50-60 cm. The robotic device then moves by some third distance in forward direction back towards the area of its initial starting position, the processor determining the third forward distance by detection of an obstacle by a sensor, such as wall or furniture. In some embodiments, the third forward distance is predetermined. In some embodiments, this back and forth movement described is repeated wherein the robotic device repeatedly makes two 90-degree turns separated by some distance before travelling in the opposite direction, such that movement of the robotic device is a boustrophedon pattern, travelling back and forth across the environment. In other embodiments, the directions of rotations are opposite to what is described in this exemplary embodiment. In some embodiments, the robotic device may not be initially facing a wall of which it is in close proximity. The robotic device may begin executing the boustrophedon movement pattern from any area within the environment. In some embodiments, the robotic device performs other movement patterns besides boustrophedon alone or in combination.

In some embodiments, the processor assigns a weight to each depth measurement. The value of the weight is determined based on various factors, such as the degree of similarity between depth measurements recorded from separate fields of view, the quality of the measurements, the weight of neighboring depth measurements, or the number of neighboring depth measurements with high weight. In some embodiments, the processor ignores depth measurements with weight less than as amount (such as a predetermined or dynamically determined threshold amount) as depth measurements with higher weight are considered to be more accurate. In some embodiments, increased weight is given to overlapping depths belonging to a larger number of overlapping depths between two sets of data, and less weight is given to overlapping depths belonging to a smaller number of overlapping depths between two sets of data. In some embodiments, the weight assigned to readings is proportional to the number of overlapping depth measurements.

In some embodiments, more than two consecutive fields of view overlap, resulting in more than two sets of depths falling within an area of overlap. This may happen when the amount of angular movement between consecutive fields of view is small, especially if the frame rate of the camera is fast such that several frames within which vector measurements are taken are captured while the robotic device makes small movements, or when the field of view of the camera is large or when the robotic device has slow angular speed and the frame rate of the camera is fast. Higher weight may be given to depths overlapping with more depths measured within other fields of view, as increased number of overlapping sets of depths provide a more accurate ground truth. In some embodiments, the amount of weight assigned to measured depths is proportional to the number of depths from other sets of data overlapping with it. Some embodiments may merge overlapping depths and establish a new set of depths for the overlapping depths with a more accurate ground truth. The mathematical method used can be a moving average or a more complex method.

Feature and location maps as described herein are understood to be the same. For example, in some embodiments a feature-based map includes multiple location maps, each location map corresponding with a feature and having a rigid coordinate system with origin at the feature. Two vectors X and X', correspond to rigid coordinate systems S and S' respectively, each describe a different feature in a map. The correspondences of each feature may be denoted by C and C', respectively. Correspondences may include, angle and distance, among other characteristics. If vector X is stationary or uniformly moving relative to vector X', the processor of the robotic device may assume that a linear function U(X') exists that may transform vector X' to vector X and vice versa, such that a linear function relating vectors measured in any two rigid coordinate systems exists.

In some embodiments, the processor determines transformation between the two vectors measured. In some embodiments, the processor uses Galilean Group Transformation to determine the transformations between the two vectors, each measured relative to a different coordinate system. Galilean transformation may be used to transform between coordinates of two coordinate systems that only differ by constant relative motion. These transformations combined with spatial rotations and translations in space and time form the inhomogeneous Galilean Group, for which the equations are only valid at speeds much less than the speed of light. In some embodiments, the processor uses the Galilean Group for transformation between two vectors X and X', measured relative to coordinate systems S and S', respectively, the coordinate systems with spatial origins coinciding at $t=t'=0$ and in uniform relative motion in their common directions.

In some embodiments, the processor determines the transformation between vector X' measured relative to coordinate system S' and vector X measured relative to coordinate system S to transform between coordinate systems. This is mathematically represented by:

$$X'=RX+a+vt$$

wherein R is a rotation matrix acting on vector X, X is a vector measured relative to coordinate system S, X' is a vector measured relative to coordinate system S', a is a vector describing displacement of coordinate system S' relative to coordinate system S, v is a vector describing uniform velocity of coordinate system S' and t is the time. After displacement, the time becomes $t'=t+s$ where s is the time over which the displacement occurred.

If $T_1=T_1(R_1; a_1; v_1; s_1)$ and $T_2=T_2(R_1; a_1; v_1; s_1)$ denote a first and second transformation, the processor of the robotic device may apply the first transformation to vector X at time t results in $T_1\{X, t\}=\{X', t'\}$ and apply the second transformation to resulting vector X' and time t' gives $T_2\{X', t'\}=\{X'', t''\}$. Assuming $T_3=T_2T_1$, wherein the transformations are applied in reverse order, is the only other transformation that yields the same result of $\{X'', t''\}$, then the processor may denote the transformations as $T_3\{X, t\}=\{X'', t''\}$. The transformation may be mathematically represented by:

$$X''=R_2(R_1X+a_1+v_1t)+a_2+v_2(t+s_1)$$

$$t''=t+s_1+s_2$$

wherein $(R_1X+a_1+v_1t)$ represents the first transformation $T_1\{X, t\}=\{X', t'\}$. Further, the following relationships hold true.

$$R_3=R_2R_1$$

$$a_3=a_2+R_2a_1+v_2s_1$$

$$v_3=v_2+R_2v_1$$

$$s_3=s_2+s_1$$

In some embodiments, the Galilean Group transformation is three dimensional, there are ten parameters used in relating vectors X and X'. There are three rotation angles, three space displacements, three velocity components and one time component, with the three rotation matrices denoted as below:

$$R_1(\theta) = \begin{bmatrix} 1 & 0 & 0 \\ 0 & \cos\theta & -\sin\theta \\ 0 & \sin\theta & \cos\theta \end{bmatrix}$$

$$R_2(\theta) = \begin{bmatrix} \cos\theta & 0 & \sin\theta \\ 0 & 1 & 0 \\ -\sin\theta & 0 & \cos\theta \end{bmatrix}$$

$$R_3(\theta) = \begin{bmatrix} \cos\theta & -\sin\theta & 0 \\ \sin\theta & \cos\theta & 0 \\ 0 & 0 & 1 \end{bmatrix}$$

The vector X and X' may for example be position vectors with components (x, y, z) and (x', y', z') or (x, y, θ) and (x', y', θ'), respectively. The method of transformation described herein allows the processor to transform vectors measured relative to different coordinate systems and describing the environment to be transformed into a single coordinate system.

Figure 1B:
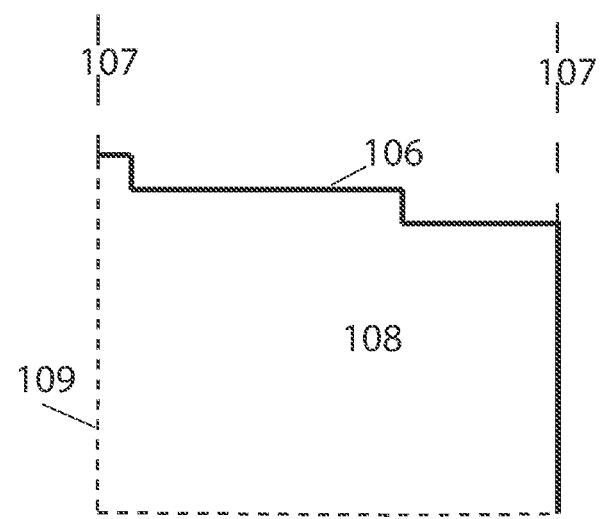

FIG. 1A illustrates camera 100 mounted on robotic device 101 measuring depths 102 at predetermined increments within a first field of view 103 of working environment 104. Depth measurements 102 taken by camera 100 measure the depth from camera 100 to object 105, which in this case is a wall. Referring to FIG. 1B, a processor of the robotic device constructs 2D map segment 106 from depth measurements 102 taken within first field of view 103. Dashed lines 107 demonstrate that resulting 2D map segment 106 corresponds to depth measurements 102 taken within field of view 103. The processor establishes first recognized area 108 of working environment 104 bounded by map segment 106 and outer limits 109 of first field of view 103. Robotic device 101 begins to perform work within first recognized area 108 while camera 100 continuously takes depth measurements.

Figure 2A:
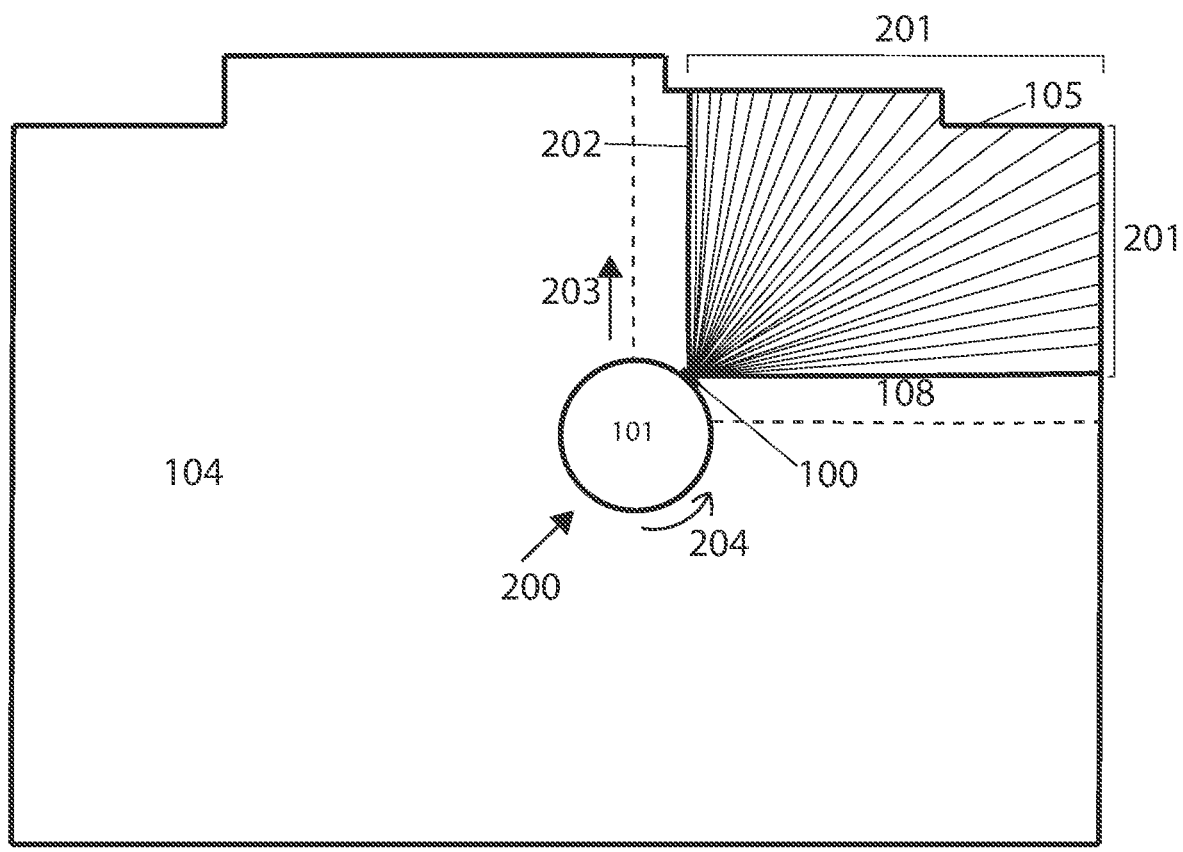
FIG. 2A illustrates a robotic device with mounted camera beginning to perform work within a first recognized area of the working environment in some embodiments.

FIG. 2A illustrates robotic device 101 translating forward in direction 200 to move within recognized area 108 of working environment 104 while camera 100 continuously takes depth measurements within the field of view of camera 100. Since robotic device 101 translates forward without rotating, no new areas of working environment 104 are captured by camera 100, however, the processor combines depth measurements 201 taken within field of view 202 with overlapping depth measurements previously taken within area 108 to further improve accuracy of the map. As robotic device 101 begins to perform work within recognized area 108 it positions to move in vertical direction 203 by first rotating in direction 204.

Figure 2B:
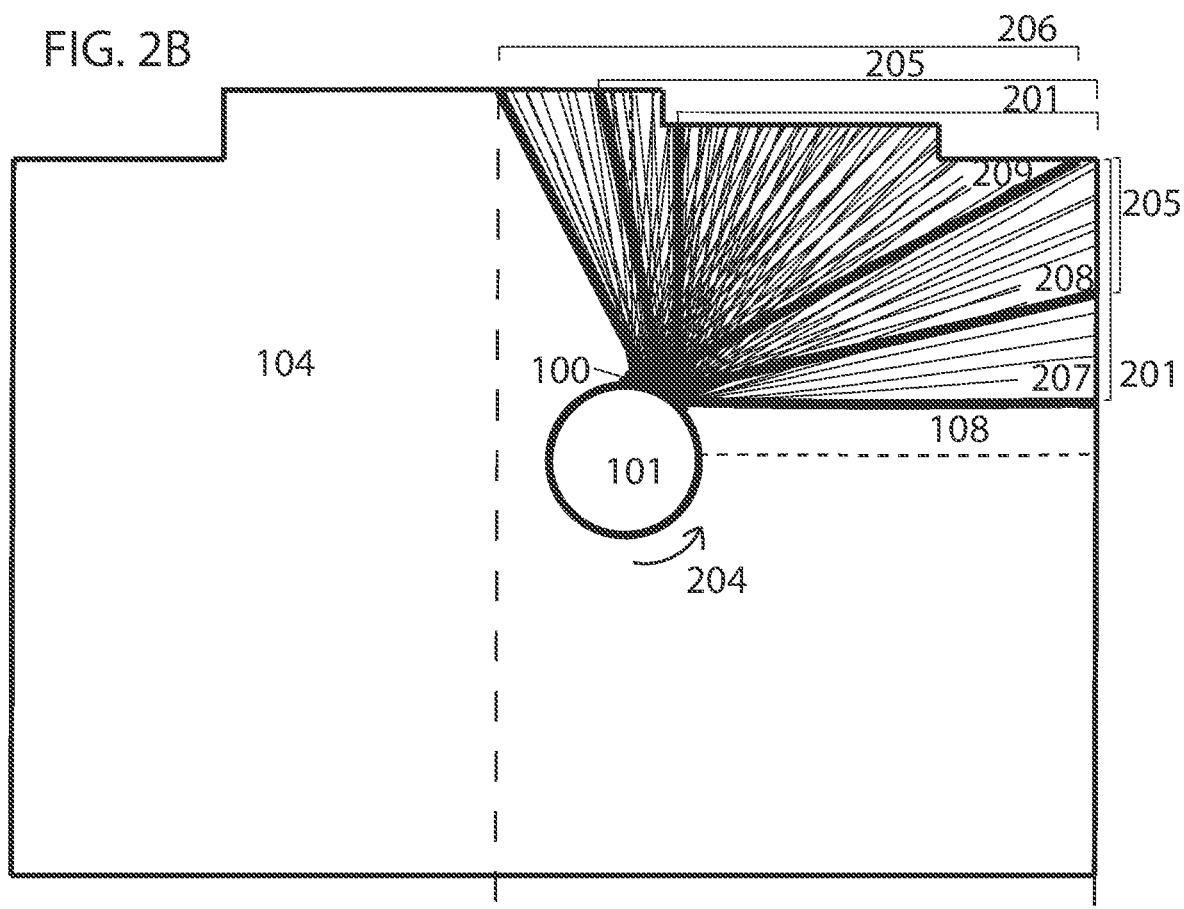
FIGS. 2B and 2C illustrate a 2D map segment constructed from depth measurements taken within multiple overlapping consecutive fields of view in some embodiments.

FIG. 2B illustrates robotic device 101 rotating in direction 204 while camera 100 takes depth measurements 201, 205 and 206 within fields of view 207, 208, and 209, respectively. The processor combines depth measurements taken within these fields of view with one another and with previously taken depth measurements 102 (FIG. 1A), using overlapping depth measurements as attachment points. The increment between fields of view 207, 208, and 209 is trivial and for illustrative purposes.

Figure 2C:
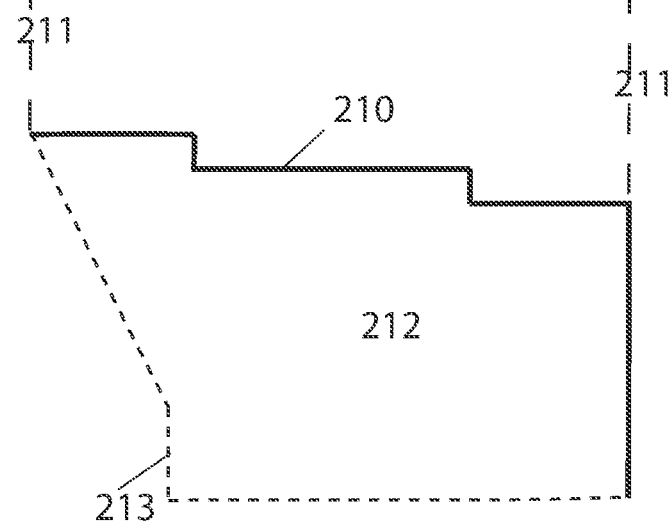

Referring to FIG. 2C, the processor constructs larger map segment 210 from depth measurements 102, 201, 205 and 206 taken within fields of view 103, 207, 208 and 209, respectively, combining them by using overlapping depth measurements as attachment points. Dashed lines 211 demonstrate that resulting 2D map segment 210 corresponds to combined depth measurements 102, 201, 205, and 206. Map segment 210 has expanded from first map segment 106 (FIG. 1B) as plotted depth measurements from multiple fields of view have been combined to construct larger map segment 210. The processor also establishes larger recognized area 212 of working environment 104 (compared to first recognized area 108 (FIG. 1B)) bound by map segment 210 and outer limits of fields of view 103 and 210 represented by dashed line 213.

Figure 3A:
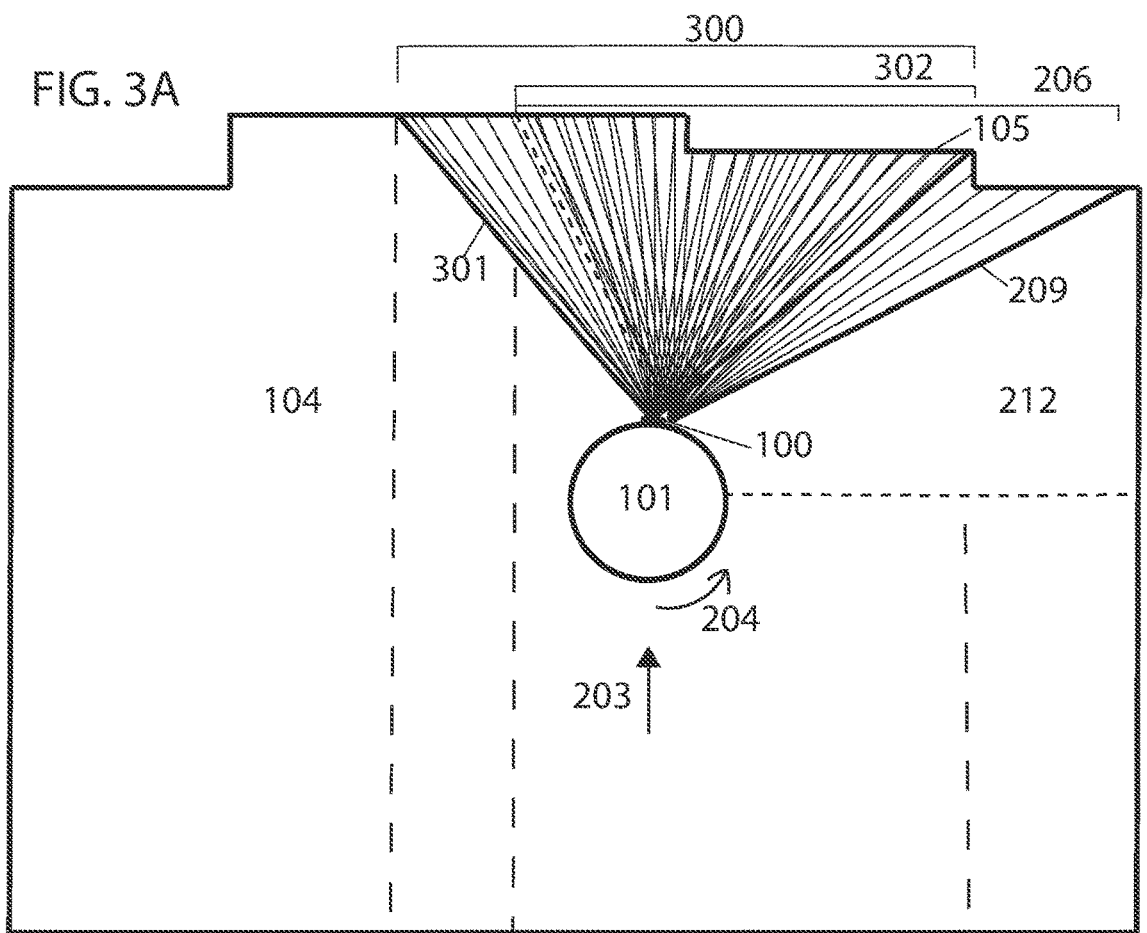
FIGS. 3A and 3B illustrate how a segment of a 2D map is constructed from depth measurements taken within two overlapping consecutive fields of view in some embodiments.
Figure 3B:
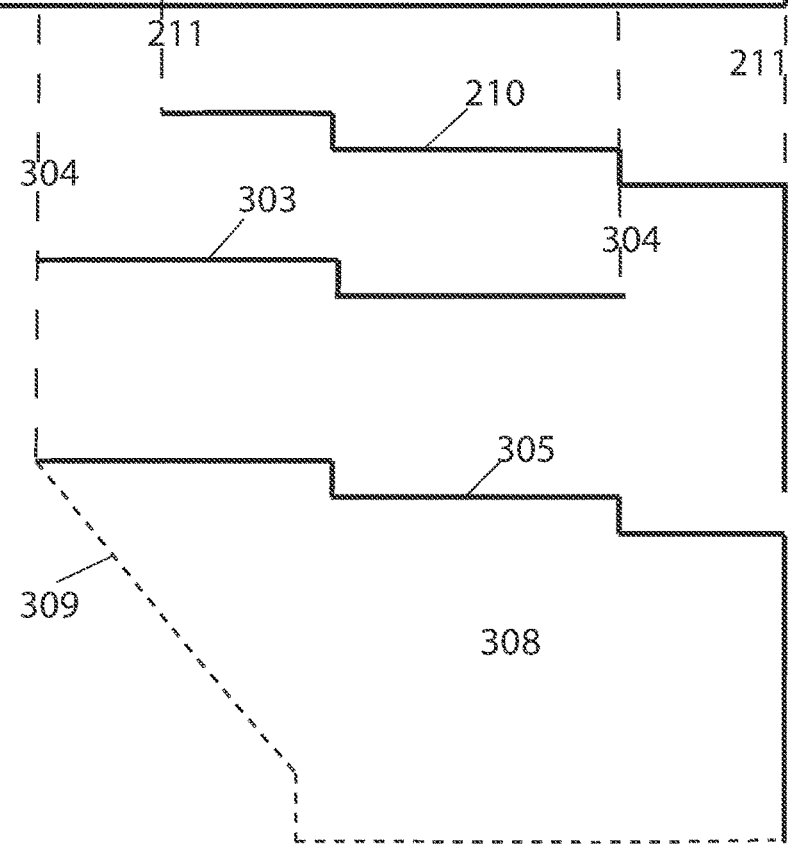

FIG. 3A illustrates robotic device 101 continuing to rotate in direction 204 before beginning to move vertically in direction 203 within expanded recognized area 212 of working environment 104. Camera 100 measures depths 300 from camera 100 to object 105 within field of view 301 overlapping with preceding depth measurements 206 taken within field of view 209 (FIG. 2B). Since the processor of robotic device 101 is capable of tracking its position (using devices such as an odometer or gyroscope) the processor can estimate the approximate overlap with previously taken depth measurements 206 within field of view 209. Depth measurements 302 represent the overlap between previously taken depth measurements 206 and depth measurements 300. FIG. 3B illustrates 2D map segment 210 resulting from previously combined depth measurements 102, 201, 205 and 206 and map segment 303 resulting from depth measurements 300. Dashed lines 211 and 304 demonstrate that resulting 2D map segments 210 and 303 correspond to previously combined depth measurements 102, 201, 205, 206 and to depth measurements 300, respectively. The processor constructs 2D map segment 305 from the combination of 2D map segments 210 and 303 bounded by the outermost dashed lines of 211 and 304. The camera takes depth measurements 300 within overlapping field of view 301. The processor compares depth measurements 300 to previously taken depth measurements 206 to identify overlapping depth measurements bounded by the innermost dashed lines of 211 and 304. The processor uses one or more of the methods for comparing depth measurements and identifying an area of overlap described above. The processor estimates new depth measurements for the overlapping depth measurements using one or more of the combination methods described above. To construct larger map segment 305, the processor combines previously constructed 2D map segment 210 and 2D map segment 303 by using overlapping depth measurements, bound by innermost dashed lines of 211 and 304, as attachment points. The processor also expands recognized area 212 within which robotic device 101 operates to recognized area 308 of working environment 104 bounded by map segment 305 and dashed line 309.

Figure 4A:
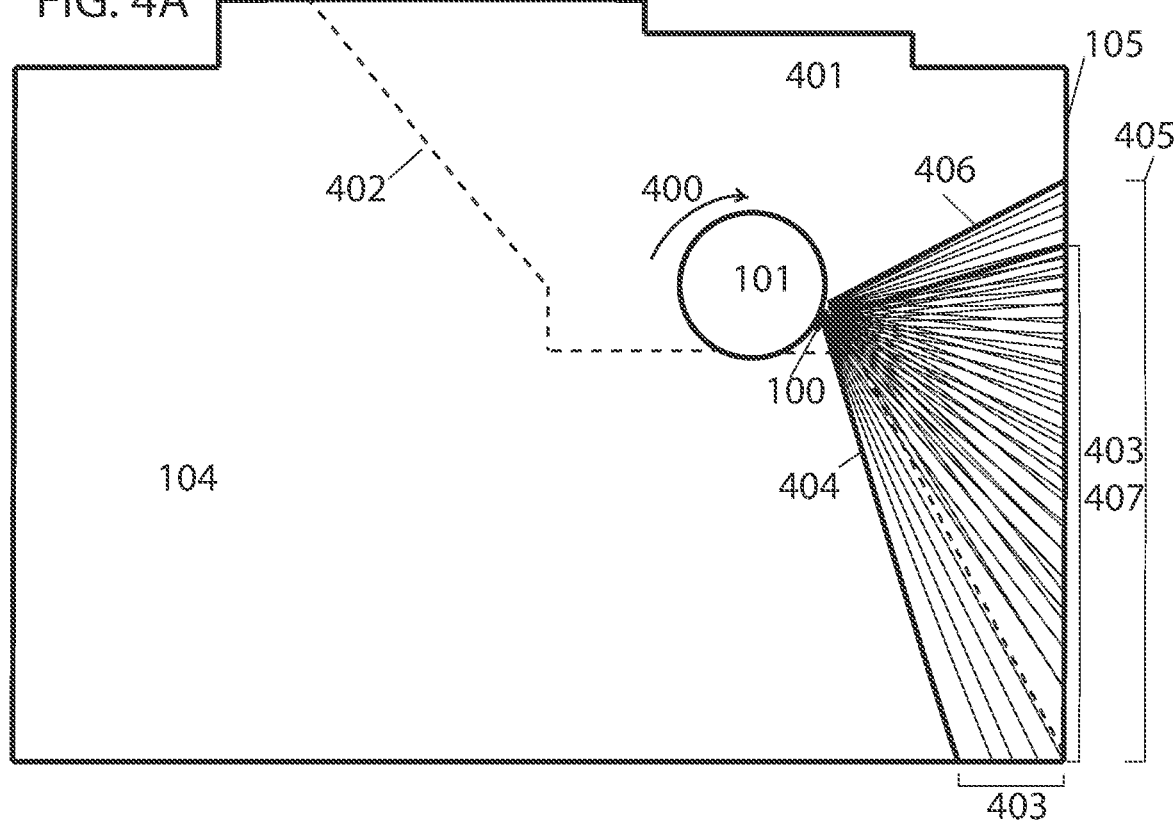
FIGS. 4A and 4B illustrate a 2D map segment constructed from depth measurements taken within two overlapping consecutive fields of view in some embodiments.
Figure 4B:
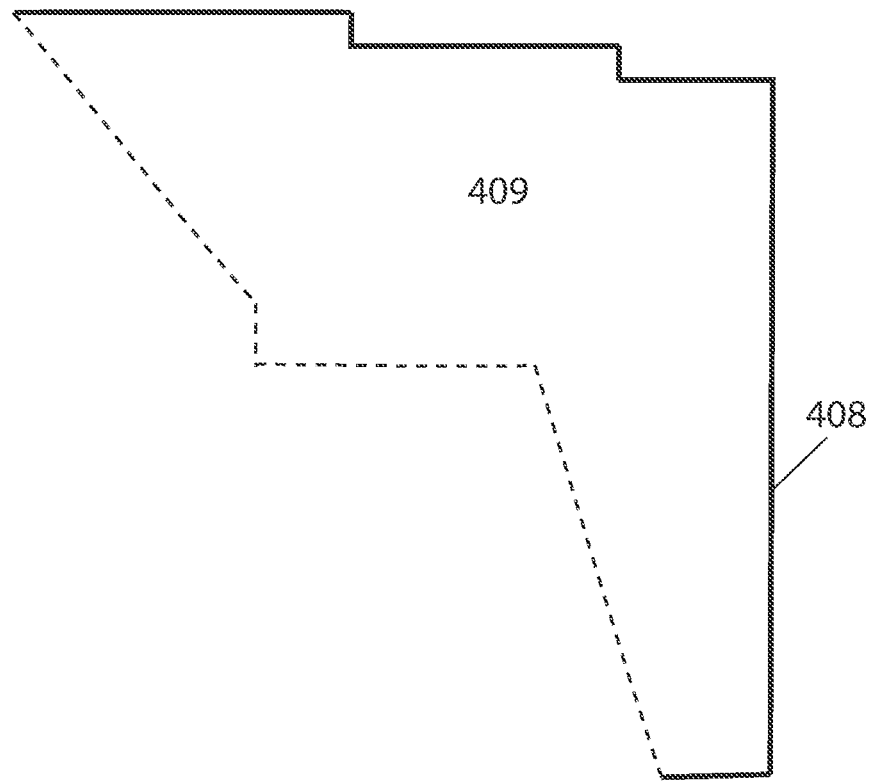

FIG. 4A illustrates robotic device 101 rotating in direction 400 as it continues to perform work within working environment 104. The processor expanded recognized area 308 to area 401 bound by wall 105 and dashed line 402. Camera 100 takes depth measurements 403 from camera 100 to object 105 within field of view 404 overlapping with preceding depth measurements 405 taken within field of view 406. Depth measurements 407 represent overlap between previously taken depth measurements 405 and depth measurements 403. FIG. 4B illustrates expanded map segment 408 and expanded recognized area 409 resulting from the processor combining depth measurements 403 and 405 at overlapping depth measurements 407. This method is repeated as camera 100 takes depth measurements within consecutively overlapping fields of view as robotic device 101 moves within the environment and the processor combines the depth measurements at overlapping points until a 2D map of the environment is constructed.

Figure 5:
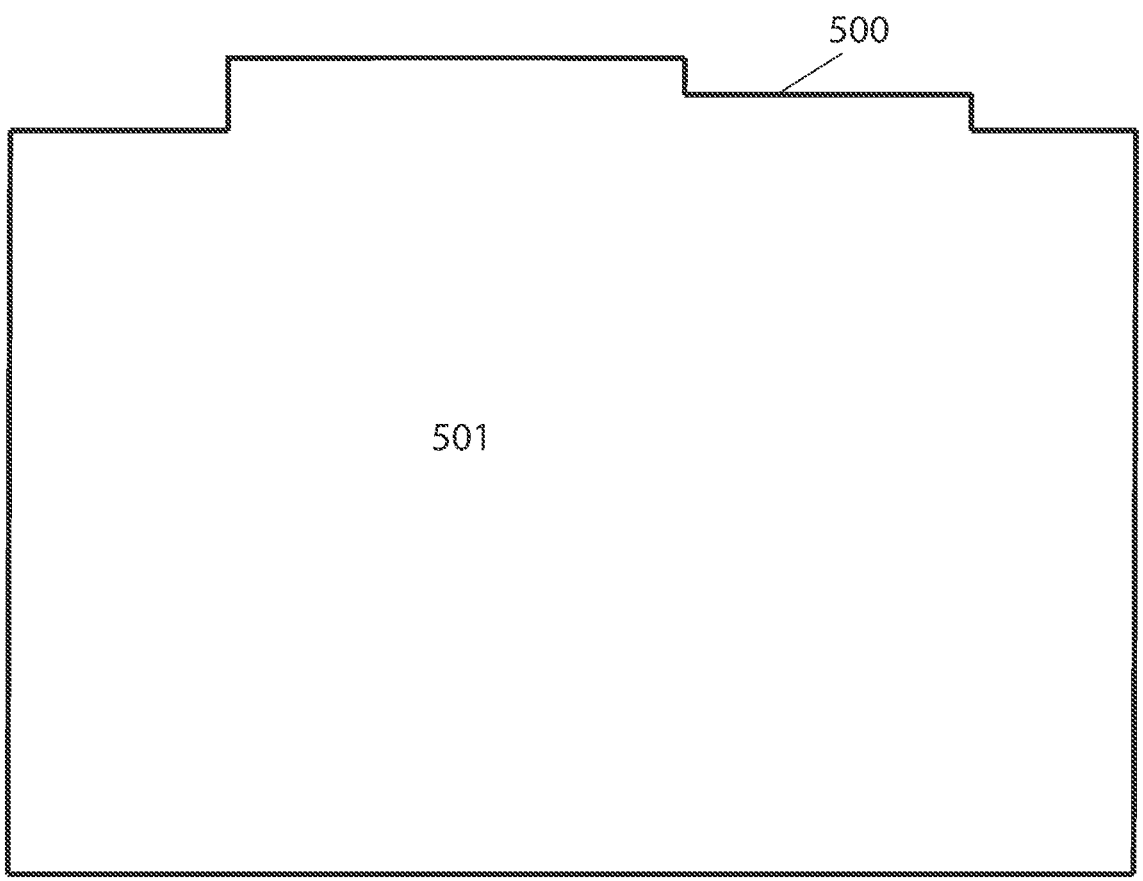
FIG. 5 illustrates a complete 2D map constructed from depth measurements taken within consecutively overlapping fields of view in some embodiments.

FIG. 5 illustrates an example of a complete 2D map 500 with bound area 501. The processor of robotic device 101 constructs map 500 by combining depth measurements taken within consecutively overlapping fields of view of camera 100. 2D map 500 can, for example, be used by robotic device 101 with mounted depth camera 100 to autonomously navigate throughout the working environment during operation.

Figure 6D:
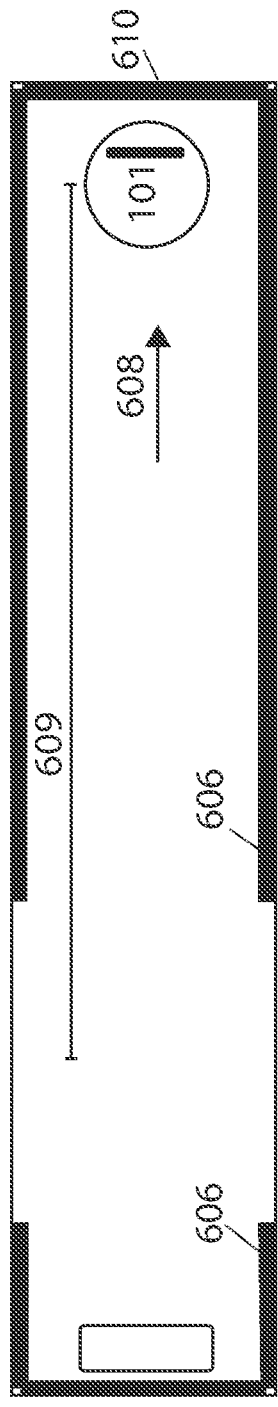
Figure 6E:
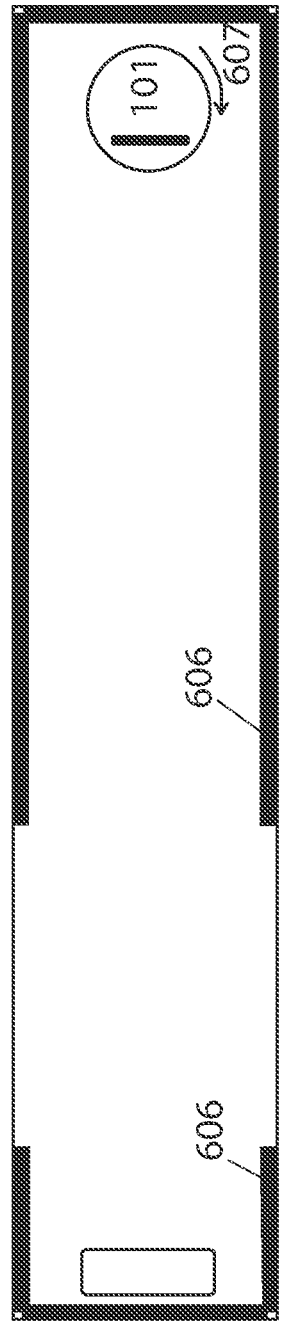
Figure 6F:
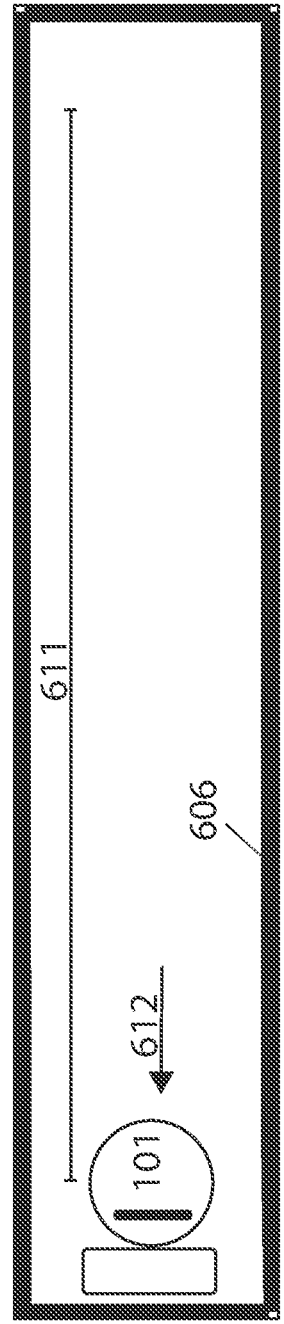

In some embodiments, the movement pattern of the robotic device during the mapping process is a boustrophedon movement pattern. In FIG. 6A robotic device 101 begins near wall 600, docked at its charging or base station 601. Robotic device 101 rotates 360 degrees in its initial position to attempt to map environment 602, however, areas 603 are not observed by the sensors of robotic device 101 as the areas surrounding robotic device 101 are too close, and the areas at the far end of environment 602 are too far to be observed. Minimum and maximum detection distances may be, for example, 30 and 400 centimeters, respectively. Instead, in FIG. 6B, robotic device 101 initially moves backwards in direction 604 away from charging or base station 601 by some distance 605 where areas 606 are observed. Distance 605 is not particularly large, it may be 40 centimeters, for example. In FIG. 6C, robotic device 101 then rotates 180 degrees in direction 607 resulting in observed areas 606 expanding. Areas immediately to either side of robotic device 101 are too close to be observed by the sensors while one side is also unseen, the unseen side depending on the direction of rotation. In FIG. 6D, robotic device 101 then moves in forward direction 608 by some distance 609, observed areas 606 expanding further as robotic device 101 explores undiscovered areas. The processor of robotic device 101 determines distance 609 by which robotic device 101 travels forward by detection of an obstacle, such as wall 610 or furniture or distance 609 is predetermined. In FIG. 6E, robotic device 101 then rotates another 180 degrees in direction 607. In FIG. 6F, robotic device 101 moves by some distance 611 in forward direction 612 observing remaining undiscovered areas. The processor determines distance 611 by which the robotic device 101 travels forward by detection of an obstacle, such as wall 600 or furniture or distance 611 is predetermined. The back and forth movement described is repeated wherein robotic device 101 makes two 180-degree turns separated by some distance, such that movement of robotic device 101 is a boustrophedon pattern, travelling back and forth across the environment while mapping. In other embodiments, the direction of rotations may be opposite to what is illustrated in this exemplary embodiment.

FIG. 7 illustrates another embodiment of a boustrophedon movement pattern of the robotic device during the mapping process. FIG. 7A illustrates robotic device 101 beginning the mapping process facing wall 700, when for example, it is docked at charging or base station 701. In such a case, robotic device 101 initially moves in backwards direction 702 away from charging station 701 by some distance 703. Distance 703 is not particularly large, it may be 40 centimeters for example. In FIG. 7B, robotic device 101 rotates 180 degrees in direction 704 such that robotic device 101 is facing into the open space of environment 705. In FIG. 7C, robotic device 101 moves in forward direction 706 by some distance 707 then rotates 90 degrees in direction 704. The processor determines distance 707 by which robotic device 101 travels forward by detection of an obstacle, such as wall 708 or furniture or distance 707 is predetermined. In FIG. 7D, robotic device 101 then moves by some distance 709 in forward direction 710 and rotates another 90 degrees in direction 704. Distance 709 is not particularly large and depends on the amount of desired overlap when cleaning the surface. For example, if distance 709 is small (e.g., less than the width of the main brush of a robotic vacuum), as robotic device 101 returns in direction 712, the surface being cleaned may overlap with the surface that was already cleaned when robotic device 101 travelled in direction 706. In some cases, this may be desirable. If distance 709 is too large (e.g., greater than the width of the main brush) some areas of the surface may not be cleaned. For example, for small robotic devices, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robotic devices brush size can be between 50-60 cm. Finally, robotic device 101 moves by some distance 711 in forward direction 712 towards charging station 701. The processor determines distance 711 by which robotic device 101 travels forward may be determined by detection of an obstacle, such as wall 700 or furniture or distance 711 is predetermined. This back and forth movement described is repeated wherein robotic device 101 repeatedly makes two 90-degree turns separated by some distance before travelling in the opposite direction, such that movement of robotic device 101 is a boustrophedon pattern, travelling back and forth across the environment while mapping. Repeated movement 713 is shown in FIG. 7D by dashed lines. In other embodiments, the direction of rotations may be opposite to what is illustrated in this exemplary embodiment.

Figure 8A:
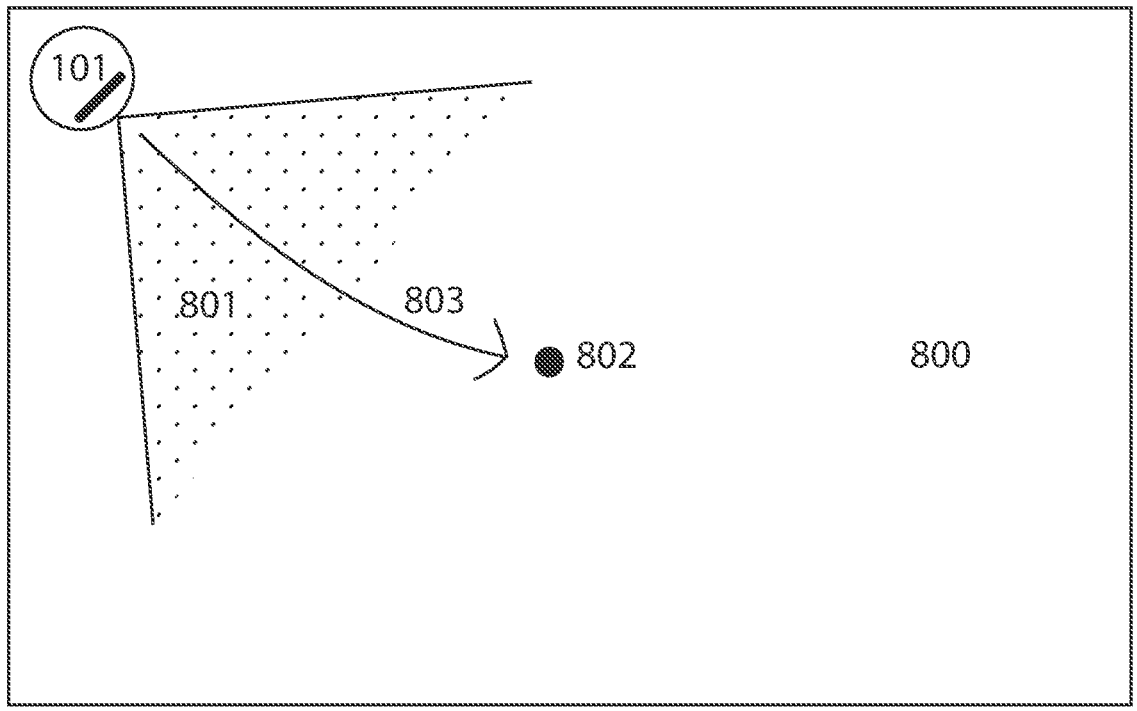
FIGS. 8A and 8B illustrates a robotic device repositioning itself for better observation of the environment in some embodiments.
Figure 8B:
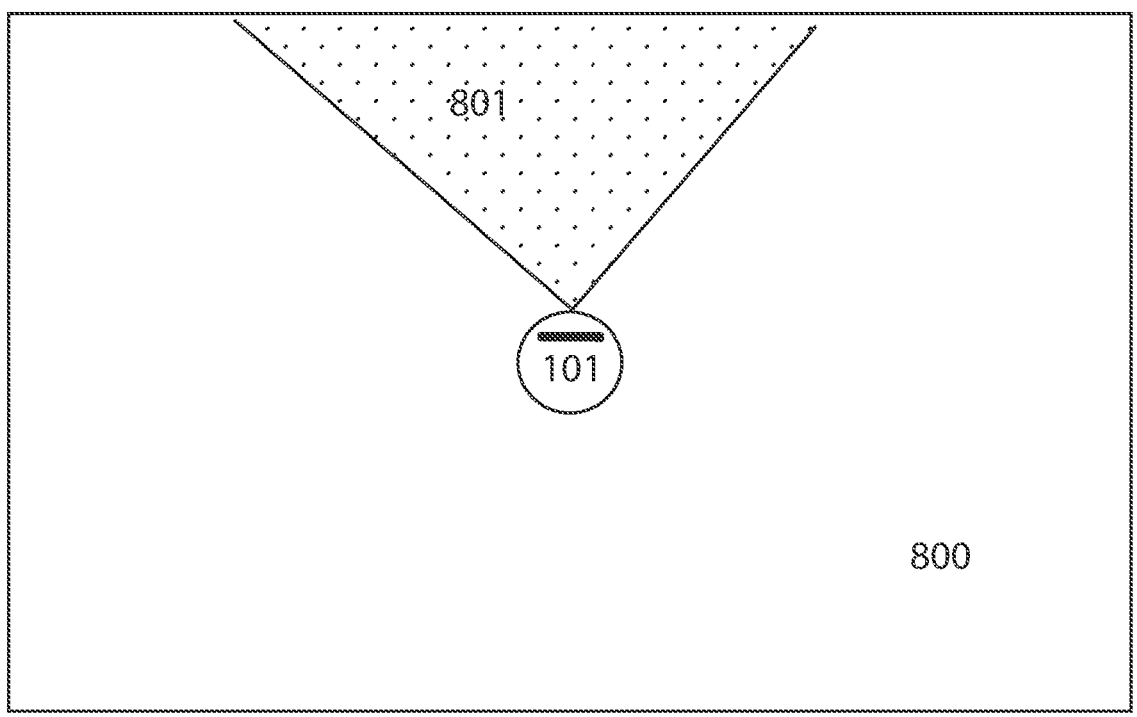

In some embodiments, the robotic device is in a position where observation of the environment by sensors is limited. This may occur when, for example, the robotic device is positioned at one end of an environment and the environment is very large. In such a case, the processor of the robotic device constructs a temporary partial map of its surroundings as it moves towards the center of the environment where its sensors are capable of observing the environment. This is illustrated in FIG. 8A, where robotic device 101 is positioned at a corner of large room 800, approximately 20 centimeters from each wall. Observation of the environment by sensors is limited due to the size of room 800 wherein field of view 801 of the sensor does not capture any features of environment 800. A large room, such as room 800, may be 8 meters long and 6 meters wide for example. The processor of robotic device 101 creates a temporary partial map using sensor data as it moves towards center 802 of room 800 in direction 803. In FIG. 8B robotic device 101 is shown at the center of room 800 where sensors are able to observe features of environment 800.

In embodiments, the constructed map of the robotic device may only be valid with accurate localization of the robotic device. For example, in FIG. 9, accurate localization of robotic device 900 at location 901 with position $x_1$, $y_1$ may result in map 902 while inaccurate localization of robot 900 at location 903 with position $x_2$, $y_2$ may result in inaccurate map 904 wherein perimeters of the map incorrectly appearing closer to robot 900 as robot 900 is localized to incorrect location 903. To eliminate or reduce such occurrences, in some embodiments, the processor constructs a map for each or a portion of possible locations of robotic device 101 and evaluates the alternative scenarios of possible locations of robotic device 101 and corresponding constructed maps of such locations. The processor determines the number of alternative scenarios to evaluate in real-time or it is predetermined. In some embodiments, each new scenario considered adds a new dimension to the environment of robotic device 101. Over time, the processor discards less likely scenarios. For example, if the processor considers a scenario placing robotic device 101 at the center of a room and yet robotic device 101 is observed to make contact with a perimeter, the processor determines that the considered scenario is an incorrect interpretation of the environment and the corresponding map is discarded. In some embodiments, the processor substitutes discarded scenarios with more likely scenarios or any other possible scenarios. In some embodiments, the processor uses a Fitness Proportionate Selection technique wherein a fitness function is used to assign a fitness to possible alternative scenarios and the fittest locations and corresponding maps survive while those with low fitness are discarded. In some embodiments, the processor uses the fitness level of alternative scenarios to associate a probability of selection with each alternative scenario. The fitness function may be mathematically represented by:

$$p_i = \frac{f_i}{\sum_{j=1}^{N} f_j}$$

wherein $f_i$ is the fitness of alternative scenario i of N possible scenarios and $p_i$ is the probability of selection of alternative scenario i. In some embodiments, the processor is less likely to eliminate alternative scenarios with higher fitness level from the alternative scenarios currently considered. In some embodiments, the processor interprets the environment using a combination of a collection of alternative scenarios with high fitness level. Examples of methods for localization of a robotic device are described in U.S. Patent Applications 62/746,688, 62/740,573, and 62/740,580, the entire contents of each of which are hereby incorporated by reference.

Figure 10:
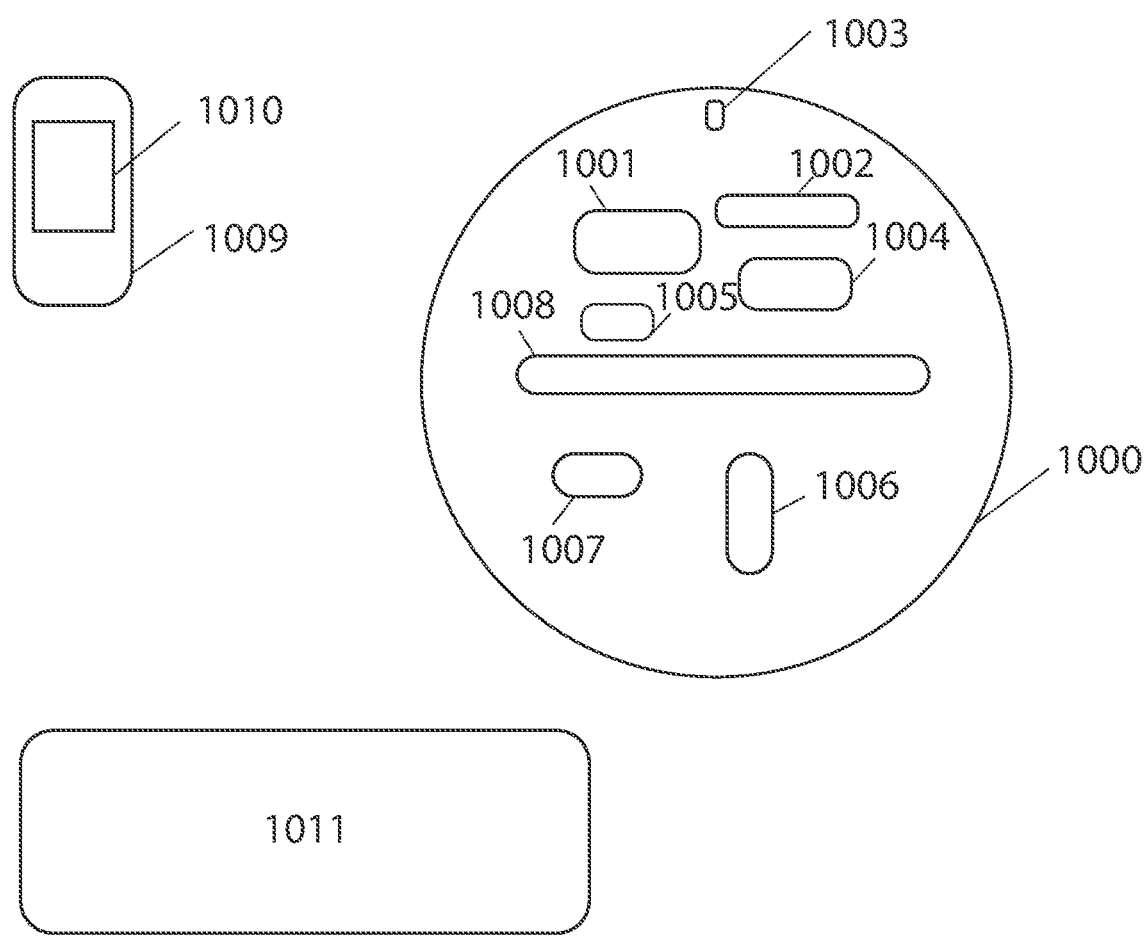
FIG. 10 illustrates a schematic diagram of an example of a robot with which the present techniques may be implemented in some embodiments.

FIG. 10 depicts an example of a robotic device 1000 with processor 1001, memory 1002, a first set of sensors 1003, second set of sensors 1004, network communication 1005, movement driver 1006, timer 1007, more or more cleaning tools 1008, and base station 1011. The first and second set of sensors 1003 and 1004 may include depth measuring devices, movement measuring devices, and the like. In some embodiments, the robotic device may include the features (and be capable of the functionality of) of a robotic device described herein. In some embodiments, program code stored in the memory 1002 and executed by the processor 1001 may effectuate the operations described herein. Some embodiments additionally include user device 1009 having a touchscreen 1010 and that executes a native application by which the user interfaces with the robot. While many of the computational acts herein are described as being performed by the robot, it should be emphasized that embodiments are also consistent with use cases in which some or all of these computations are offloaded to a base station computing device on a local area network with which the robot communicates via a wireless local area network or a remote data center accessed via such networks and the public internet.

Figure 11:
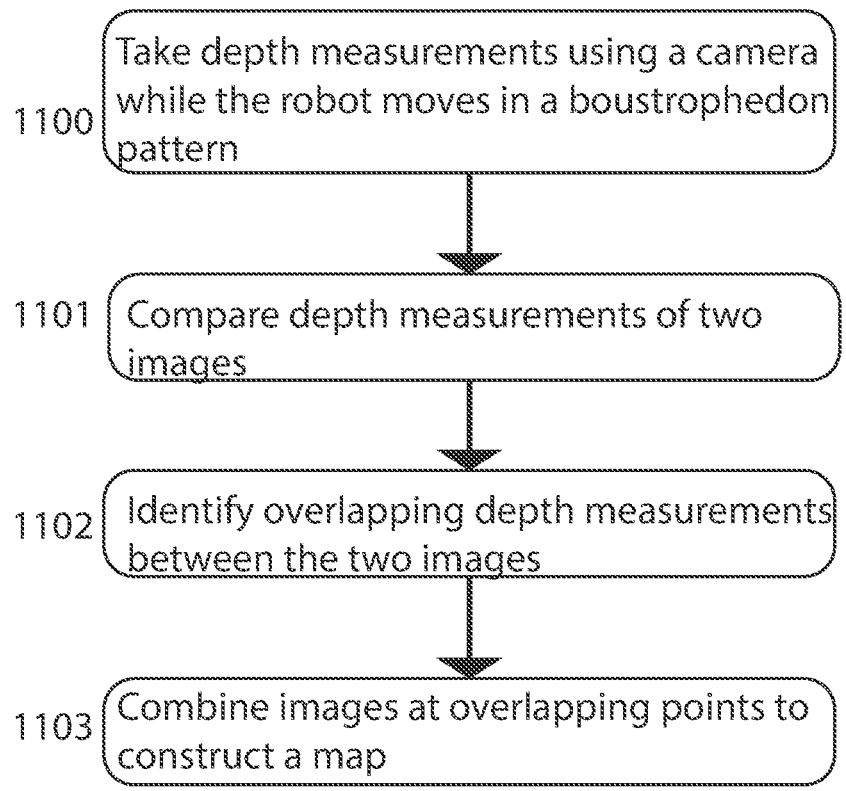
FIG. 11 illustrates a flowchart describing an example of a method for finding the boundary of an environment in some embodiments.

FIG. 11 illustrates a flowchart describing embodiments of a path planning method of a robotic device 1100, 1101, 1102 and 1103 corresponding with steps performed in some embodiments.

While the examples and illustrations provided apply some of the present techniques to the construction of a 2D map using 2D depth measurements, the 2D map may be constructed using 3D depth measurements as well. Furthermore, embodiments may construct a 3D map of the environment using 3D depth measurements. The 3D map of the environment may be constructed using at least one camera, such as a depth measuring camera, capable of taking 3D depth measurements. For example, in some embodiments, the processor combines 3D depth measurements taken within overlapping fields of view by using overlapping depth measurements as attachment points. In some embodiments, a 2D map is extracted from a 3D map or 3D data.

The resulting map may be encoded in various forms. For instance, some embodiments may construct a point cloud of three dimensional points by transforming vectors into a vector space with a shared origin, e.g., based on the above-described vectors, in some cases displacement vectors may be used and refined based on measured depths. Some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when plotting.

In some embodiments, more than two sets of depth measurements may overlap. The combination of increased number of overlapping sets of depth measurements results in depth measurements with more accurate ground truth. In some embodiments, each depth measurement overlaps with at least one other depth measurement taken from another field of view.

In some embodiments, more than one camera may be used to improve accuracy of the map. For example, a plurality of depth measuring cameras (e.g., carried by the robot) may be used simultaneously (or concurrently) where depth measurements from each camera are used to more accurately map the environment. The use of a plurality of depth measuring cameras is expected to allow for the collection of depth measurements from different perspectives and angles, for example. Where more than one depth measuring camera is used, triangulation or others suitable methods may be used for further data refinement and accuracy. In some embodiments, a 360-degree LIDAR is used to create a map of the environment. It should be emphasized, though, that embodiments are not limited to techniques that construct a map in this way, as the present techniques may also be used for plane finding in augmented reality, barrier detection in virtual reality applications, outdoor mapping with autonomous drones, and other similar applications, which is not to suggest that any other description is limiting.

In some embodiments, the processor of the robotic device uses sensor data to estimate its location within the environment prior to beginning and during the mapping process. In some embodiments, sensors of the robotic device capture data and the processor initially estimates the location of the robotic device based on the data and measured movement (e.g., using devices such as a gyroscope, optical encoder, etc.) of the robotic device. As more data is collected, the processor increases the confidence in the estimated location of the robotic device, and when movement occurs the processor decreases the confidence due to noise in measured movement. Some examples of methods for localizing a robotic device while creating a map of the environment are described in U.S. Patent Applications 62/746,688, 62/740, 573, and 62/740,580, the entire contents of each of which are hereby incorporated by reference.

In some embodiments, the mapping methods described herein are combined with other mapping methods. Examples of other mapping methods are described in U.S. patent application Ser. No. 16/048,179, a U.S. Patent Application titled METHODS FOR FINDING THE PERIMETER OF A PLACE USING OBSERVED COORDINATES, filed on the same day as this application by the same applicants, and a U.S. Patent Application titled DISCOVERING AND PLOTTING THE BOUNDARY OF AN ENCLOSURE, filed on the same day as this application by the same applicants, and U.S. Provisional Patent Application 62/637,156, the entire contents of each of which are hereby incorporated by reference.

In some embodiments, the map of the area, including but not limited to doorways, sub areas, perimeter openings, and information such as coverage pattern, room tags, order of rooms, etc. is available to the user through a graphical user interface (GUI) such as a smartphone, computer, tablet, dedicated remote control, or any device that may display output data from the robotic device and receive inputs from a user. Through the GUI, a user may review, accept, decline, or make changes to, for example, the map of the environment and settings, functions and operations of the robotic device within the environment, which may include, but are not limited to, type of coverage algorithm of the entire area or each subarea, correcting or adjusting map boundaries and the location of doorways, creating or adjusting subareas, order of cleaning subareas, scheduled cleaning of the entire area or each subarea, and activating or deactivating tools such as UV light, suction and mopping. User inputs are sent from the GUI to the robotic device for implementation. Data may be sent between the robotic device and the user interface through one or more network communication connections. Any type of wireless network signals may be used, including, but not limited to, Wi-Fi signals, or Bluetooth signals. These techniques are further described in U.S. patent application Ser. No. 15/949,708, Ser. No. 15/272,752, and 62/661,802, 62/631,050, the entirety of each of which is incorporated herein by reference.

The foregoing descriptions of specific embodiments of the invention have been presented for purposes of illustration and description. They are not intended to be exhaustive or to limit the invention to the precise forms disclosed.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships (e.g., "in response to X, Y," "upon X, Y,", "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus specially designed to carry out the stated functionality, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct (e.g., reference to "parallel" surfaces encompasses substantially parallel surfaces). The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. Negative inferences should not be taken from inconsistent use of "(s)" when qualifying items as possibly plural, and items without this designation may also be plural.

The invention claimed is:

1. A method executed by a robot, the method comprising:
    starting, from a starting position, a work session in which the robot maps a workspace, wherein a front of the robot faces towards a forward direction in a frame of reference of the robot and, while the robot is in the starting position, the front of the robot faces towards a first direction in a frame of reference of the workspace;
    the robot traversing, from the starting position, to a first position, a first distance from the starting position in a backward direction in the frame of reference of the robot and in a second direction in the frame of reference of the workspace, the backward direction being opposite the forward direction in the frame of reference of the robot, and the second direction being opposite the first direction in the frame of reference of the workspace;
    after traversing the first distance, the robot rotating;
    after rotating, the robot traversing a coverage path of at least one area of the workspace, the coverage path including a boustrophedon movement pattern; and
    the robot cleaning the at least one area of the workspace with a cleaning tool of the robot while traversing the coverage path, the robot traversing the coverage path comprising a repeated iteration of:
        the robot traversing a linear segment in a third direction in the frame of reference of the workspace;
        the robot rotating 180 degrees;
        the robot traversing a linear segment in a fourth direction in the frame of reference of the workspace, the fourth direction being opposite the third direction; and
        the robot rotating 180 degrees;
    wherein each 180 degrees rotation comprises the robot traversing a distance of less than a coverage width of the robot in a direction perpendicular to the linear segments after starting the respective 180 degrees rotation and before finishing the respective 180 degrees rotation-, covering parts of the workspace wherein, through a plurality of map iterations, a processor of the robot expands a map of the workspace in each map iteration to include a respective part of the workspace covered, and the expansion of the map continues until all perimeters of the workspace are encountered, wherein the encountered perimeters of the workspace define perimeters of the map of the workspace.

2. The method of claim 1, wherein:
    a length of each linear segment is based on a fixed distance; and
    the length of each linear segment is reduced when the robot encounters a wall or an object while traversing the respective linear segment.

3. The method of claim 2, wherein the robot rotates 180 degrees after traversing a linear segment of the coverage path or when the robot encounters the wall or the object while traversing the linear segment.

4. The method of claim 1, further comprising:
    for each map iteration, the processor discounting overlapping coverage resulting from the robot traversing the distance of less than the coverage width of the robot in the direction perpendicular to the linear segments after starting each respective 180 degrees rotation and before finishing the respective 180 degrees rotation.

5. The method of claim 4, wherein:
    a completed map of the workspace reflects a surface area of workspace; and
    the surface area of the workspace is smaller than a total surface area of a coverage path traversed by the robot.

6. The method of claim 1, wherein the map is completed when coverage of the workspace is completed.

7. The method of claim 1, wherein the coverage path comprises a path traversed by the robot for cleaning of the workspace.

8. The method of claim 1, further comprising:
a processor of the robot expanding a map of the workspace while the robot traverses a coverage path in areas previously uncovered by the robot and simultaneously cleans the workspace.

9. The method of claim 1, further comprising:
a processor of the robot marking walls or objects within a map of the workspace upon the robot encountering a wall or an object while traversing at least the linear segments to perform coverage.

10. The method of claim 9, wherein:
a linear swarm of temporally encountered points are formed as a result the robot temporally encountering walls or objects; and
the linear swarm of temporally encountered points mark the walls and the objects of the map of the workspace.

11. The method of claim 10, wherein the robot temporally encounters walls or objects when the robot arrives at a point in the workspace near the walls or the objects.

12. The method of claim 11, wherein the robot arriving at the point comprises the robot making contact with the walls or the objects or the robot avoiding contact with the walls or the objects using a near field sensor to sense the walls or objects.

13. The method of claim 11, wherein forming the linear swarm of temporally encountered points is a substitute for forming a linear swarm from sensor data captured by a camera or laser distance sensor without the robot encountering the walls or objects.

14. The method of claim 10, wherein two parallel linear swarms of temporally encountered points positioned within an interior of the map mark a single partitioning or dividing wall, separating two rooms within the map, with each side of two sides of the single wall facing one of the two separated rooms.

15. The method of claim 1, wherein:
the starting position corresponds to a location of a base station within the workspace; and
the base station is configured to charge a battery of the robot.

16. The method of claim 15, wherein the base station is placed within the workspace such that a space behind the base station in the first direction in the frame of reference of the workspace is occupied by a wall.

17. The method of claim 16, wherein the base station is placed within the workspace such that a certain distance from the base station in the second direction, third direction, and fourth direction is unoccupied.

18. The method of claim 15, further comprising:
upon completion of coverage of the workspace, the robot aligning the forward direction in the frame of the reference of the robot with the first direction in the frame of the reference of the workspace and traversing a distance to reach the starting position.

19. The method of claim 15, wherein a processor of the robot uses the base station as a seed localization or a known location.

20. The method of claim 1, further comprising:
a processor of the robot generating virtually simulated robots located at different possible locations within the workspace.

21. The method of claim 20, further comprising:
the processor comparing real-time sensor data with a map of the workspace previously built in a prior work session;
the processor finding a match between the real-time sensor data and the map.

22. The method of claim 21, wherein the processor compares the real-time sensor data with the previously built map for each virtually simulated robot from a simulated field of view of the respective virtually simulated robot.

23. The method of claim 21, further comprising:
finding a location of a virtually simulated robot in relation to the workspace among the plurality of virtually simulated robots located at different possible locations that best matches with the real-time sensor data; and
the processor determining a location of the robot based on the location of the virtually simulated robot that best matches with the real-time sensor data.

24. The method of claim 20, further comprising:
the processor generating a virtually simulated map associated with each virtually simulated robot, each virtually simulated map being from a virtually simulated field of view of the respective virtually simulated robot.

25. The method of claim 20, further comprising:
the processor iteratively replacing non-viable virtually simulated robots with viable simulated robots or newly generated virtually simulated robots.

26. The method of claim 25, further comprising:
the processor sorting the virtually simulated robots based on a degree of fit between the real-time sensor data and the previously built map.

27. The method of claim 26, wherein the virtually simulated robot used in localizing the robot follows a survival of the fittest algorithm.

28. The method of claim 1, further comprising:
a sensor of the robot capturing a plurality of sensor data upon the robot encountering objects within the workspace;
a processor of the robot forming a map of the workspace based on the captured sensor data, comprising at least:
the processor determining an alignment of first captured sensor data and second captured sensor data.

29. The method of claim 1, further comprising:
capturing, with at least one sensor of a plurality of sensors of the robot, a plurality of sensor data upon the robot encountering objects within the workspace, wherein the plurality of sensor data are temporal.

30. The method of claim 29, wherein the at least one sensor has a limited operational range.

31. The method of claim 30, further comprising:
the processor aligning the first captured sensor data and the second captured sensor data based on points of overlap between the first captured sensor data and the second captured sensor data; and
the processor forming at least part of the map of the workspace based on the first captured sensor data and the second captured sensor data.

32. The method of claim 1, comprising:
the robot receiving an update applied to a map of the workspace from an application of a user device paired with the robot; and
the robot receiving an instruction to execute an action from the application of the user device;
wherein:
updates applied to the map are based on user inputs to the application of the user device designating: an addition, a modification, or a deletion of a boundary;

an addition, a modification, or a deletion of a zone; and an addition, modification, or deletion of a name of a subarea; and the action is determined based on user inputs to the application of the user device designating at least one of: a selection of a type of coverage within the workspace or a subarea of the workspace; a cleaning schedule of the workspace or a subarea of the workspace; and a selection of a cleaning tool to use within the workspace or a subarea of the workspace.

33. The method of claim 1, further comprising:

a processor of the robot generating maps of the workspace during a single work session or over multiple work sessions.

* * * * *